US008880722B2

(12) United States Patent
Chapweske et al.

(10) Patent No.: US 8,880,722 B2
(45) Date of Patent: *Nov. 4, 2014

(54) DYNAMIC MEDIA BIT RATES BASED ON ENTERPRISE DATA TRANSFER POLICIES

(71) Applicant: Google Inc., Mountain View, CA (US)

(72) Inventors: Justin F. Chapweske, Bozeman, MT (US); Ryan Brase, Minneapolis, MN (US); Chad A. Tippin, Dunedin, FL (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/893,984

(22) Filed: May 14, 2013

(65) Prior Publication Data

US 2013/0254420 A1    Sep. 26, 2013

Related U.S. Application Data

(63) Continuation of application No. 13/409,080, filed on Feb. 29, 2012, now Pat. No. 8,458,355, which is a continuation of application No. 12/486,589, filed on Jun. 17, 2009, now Pat. No. 8,150,992.

(60) Provisional application No. 61/073,542, filed on Jun. 18, 2008.

(51) Int. Cl.
| | |
|---|---|
| *G06F 15/16* | (2006.01) |
| *H04N 21/239* | (2011.01) |
| *H04L 29/06* | (2006.01) |
| *H04N 7/173* | (2011.01) |
| *H04N 21/24* | (2011.01) |
| *H04N 21/2343* | (2011.01) |

(52) U.S. Cl.
CPC ............ *H04L 29/06* (2013.01); *H04N 21/2393* (2013.01); *H04N 7/17336* (2013.01); *H04N 21/2402* (2013.01); *H04N 21/23439* (2013.01)
USPC ............................ 709/231; 709/203; 709/223

(58) Field of Classification Search
CPC ..... H40L 29/06; H40L 67/029; H40L 65/604; H04N 21/2393; H04N 7/17336; H04N 21/2402; H04N 21/23439
USPC .................. 709/231, 203, 217, 219, 233, 223
See application file for complete search history.

(56) References Cited

U.S. PATENT DOCUMENTS

| | | |
|---|---|---|
| 4,881,264 A | 11/1989 | Merkle |
| 6,141,659 A | 10/2000 | Barker et al. |

(Continued)

FOREIGN PATENT DOCUMENTS

| | | |
|---|---|---|
| EP | 1298931 | 4/2003 |
| EP | 1638333 | 3/2006 |

(Continued)

OTHER PUBLICATIONS

Office Action for U.S. Appl. No. 13/626,463, dated Aug. 21, 2013, 13 pages.

(Continued)

*Primary Examiner* — Lashonda Jacobs
(74) *Attorney, Agent, or Firm* — Amin, Turocy & Watson, LLP

(57) ABSTRACT

In general, this disclosure describes techniques of dynamically selecting versions of media content based on data transfer policies of a media content provider that provides the media content. As described herein, a media content provider may establish a variety of data transfer policies for a variety of purposes. When requests are received, versions of media assets indicated by the requests are selected such that an overall bandwidth utilization of the media content provider is likely to be substantially equal to a desired bandwidth utilization established by one or more of the enterprise data transfer policies.

20 Claims, 13 Drawing Sheets

(56) References Cited

U.S. PATENT DOCUMENTS

| | | | |
|---|---|---|---|
| 6,195,680 B1 | 2/2001 | Goldszmidt et al. | |
| 6,339,785 B1 | 1/2002 | Feigenbaum | |
| 6,477,522 B1 | 11/2002 | Young | |
| 6,601,136 B2* | 7/2003 | Gunaseelan et al. | 711/112 |
| 6,742,023 B1 | 5/2004 | Fanning et al. | |
| 6,771,674 B1 | 8/2004 | Schuster et al. | |
| 6,772,337 B1 | 8/2004 | Yener | |
| 7,047,309 B2 | 5/2006 | Baumann et al. | |
| 7,058,721 B1 | 6/2006 | Ellison et al. | |
| 7,133,368 B2 | 11/2006 | Zhang et al. | |
| 7,251,691 B2 | 7/2007 | Boyd et al. | |
| 7,277,950 B1 | 10/2007 | Chapweske | |
| 7,555,559 B2 | 6/2009 | Chapweske | |
| 7,831,718 B2 | 11/2010 | Chapweske | |
| 7,979,570 B2 | 7/2011 | Chapweske et al. | |
| 8,103,786 B2 | 1/2012 | Chapweske | |
| 8,150,992 B2 | 4/2012 | Chapweske et al. | |
| 2001/0051996 A1 | 12/2001 | Cooper et al. | |
| 2002/0002708 A1 | 1/2002 | Arye | |
| 2002/0003541 A1 | 1/2002 | Boyd et al. | |
| 2002/0042924 A1* | 4/2002 | Adams | 725/114 |
| 2002/0049760 A1 | 4/2002 | Scott et al. | |
| 2002/0049846 A1* | 4/2002 | Horen et al. | 709/226 |
| 2002/0065922 A1 | 5/2002 | Shastri | |
| 2002/0108112 A1 | 8/2002 | Wallace et al. | |
| 2002/0133247 A1 | 9/2002 | Smith et al. | |
| 2002/0138443 A1 | 9/2002 | Schran et al. | |
| 2004/0064573 A1 | 4/2004 | Leaning et al. | |
| 2004/0078470 A1 | 4/2004 | Baumeister et al. | |
| 2004/0111526 A1 | 6/2004 | Baldwin et al. | |
| 2004/0193900 A1 | 9/2004 | Nair | |
| 2004/0205093 A1 | 10/2004 | Li et al. | |
| 2004/0250286 A1 | 12/2004 | Fraser et al. | |
| 2005/0010792 A1 | 1/2005 | Carpentier et al. | |
| 2005/0021575 A1 | 1/2005 | Boyd et al. | |
| 2005/0102371 A1 | 5/2005 | Aksu | |
| 2005/0183120 A1 | 8/2005 | Jain et al. | |
| 2006/0026161 A1 | 2/2006 | Henseler | |
| 2006/0168632 A1 | 7/2006 | Honda et al. | |
| 2006/0235883 A1 | 10/2006 | Krebs | |
| 2007/0078876 A1 | 4/2007 | Hayashi et al. | |
| 2007/0088844 A1 | 4/2007 | Seims | |
| 2007/0157267 A1 | 7/2007 | Lopez-Estrada | |
| 2007/0261072 A1* | 11/2007 | Boulet et al. | 725/14 |
| 2008/0040497 A1 | 2/2008 | Venkatramani et al. | |
| 2008/0046917 A1* | 2/2008 | de Heer | 725/32 |
| 2008/0050096 A1 | 2/2008 | Ryu | |
| 2008/0104121 A1* | 5/2008 | Gottlieb et al. | 707/104.1 |
| 2008/0141317 A1* | 6/2008 | Radloff et al. | 725/87 |
| 2008/0201416 A1 | 8/2008 | Lipton | |
| 2009/0106356 A1 | 4/2009 | Brase et al. | |
| 2009/0150557 A1 | 6/2009 | Wormley et al. | |
| 2009/0185619 A1* | 7/2009 | Taleb et al. | 375/240.02 |
| 2009/0327512 A1 | 12/2009 | Chapweske | |
| 2010/0023579 A1 | 1/2010 | Chapweske et al. | |
| 2010/0146145 A1 | 6/2010 | Tippin et al. | |
| 2010/0191656 A1* | 7/2010 | Martin et al. | 705/80 |

FOREIGN PATENT DOCUMENTS

| | | |
|---|---|---|
| GB | 2395387 | 5/2004 |
| WO | 0139002 | 5/2001 |
| WO | 0191417 | 11/2001 |
| WO | 2007063430 | 6/2007 |
| WO | 2009075766 | 6/2009 |

OTHER PUBLICATIONS

Notification of Transmittal of the International Search Report and the Written Opinion of the International Searching Authority, or the Declaration from corresponding PCT Application No. PCT/US2009/043484, mailed Nov. 23, 2009, (11 pages).

Notification Concerning Transmittal of International Preliminary Report on Patentability (Chapter I of the Patent Cooperation Treaty) for corresponding patent application No. PCT/US2009/043484, mailed Nov. 25, 2010, 7 pages.

Notification of Transmittal of the International Search Report and the Written Opinion of the International Searching Authority, or the Declaration for corresponding patent application No. PCT/US2009/047680, mailed Oct. 20, 2009, (16 pages).

International Preliminary Report on Patentability from International application No. PCT/US2009/047680, dated Dec. 29, 2010, 11 pp.

Notice of Allowance for U.S. Appl. No. 12/486,589, dated Nov. 29, 2011, 21 pages.

Office Action from U.S. Appl. No. 12/486,589, dated May 31, 2011, 12 pp.

Rodriguez, et al., "Parallel-Access for Mirror Sites in the Internet," Institut EURECOM, Mar. 26, 2000, 864-873 pp.

Office Action from U.S. Appl. No. 12/252,782, dated May 16, 2011, 13 pp.

Response to Office Action dated May 16, 2011, from U.S. Appl. No. 12/252,782, filed Aug. 16, 2011, 20 pp.

Office Action from U.S. Appl. No. 12/252,782, dated Nov. 29, 2010, 13 pp.

Response to Office Action dated Nov. 29, 2010, from U.S. Appl. No. 12/252,782, filed Feb. 28, 2011, 18 pp.

Suh, et al., "Push-to-Peer Video-on-Demand system: design and evaluation," Thomson Technical Report, Nov. 29, 2006, 15 pp.

Office Action from U.S. Appl. No. 12/328,139, dated Feb. 9, 2011, 14 pp.

Response to Office Action dated Feb. 9, 2011, from U.S. Appl. No. 12/328,139, dated Apr. 11, 2011, 10 pp.

Advisory Action from U.S. Appl. No. 12/328,139, dated May 5, 2011, 3 pp.

Responsive Amendment after Final Office Action dated Feb. 9, 2011, and Advisory Action dated May 5, 2011, for U.S. Appl. No. 12/328,139, filed May 9, 2011, 20 pp.

Office Action from U.S. Appl. No. 12/328,139, dated Sep. 20, 2010, 12 pp.

Response to Office Action dated Sep. 20, 2010, from U.S. Appl. No. 12/328,139, dated Dec. 16, 2010, 19 pp.

U.S. Appl. No. 61/073,542, filed Jun. 18, 2008, entitled "Dynamic Media Bit Rates Based on Enterprise Data Transfer Policies,".

Kaminsky, D., "Vectorcast: A Proposal Regarding the efficient Distribution of Data on High Bandwidth Networks," Jan. 12, 1998, 4 pages.

Francis, P., "Yallcast: Extending the Internet Multicast Architecture," Sep. 30, 1999, pp. 1-39.

Byers, J., et al., "Accessing Multiple Mirror Sites in Parallel: Using Tornado Codes to Speed Up Downloads," Apr. 1999, pp. 275-283.

Dessent, Brian, "Brian's BitTorrent FAQ and Guide," May 10, 2003, accessed from http://www.dessent.net/btfaq, 40 pgs.

Koman, Richard, "The Swarmcast Solution," May 24, 2001, accessed from http://openp2p.com/lpt/a/883, 4 pgs.

Padmanabhan, et al., "Distributing Streaming Media Content Using Cooperative Networking," Proceedings of the 12th International Workshop on Network and Operating Systems Support for Digital Audio: NOSSDAV, May 12-14, 2002, pp. 177-186.

Byers, et al., "A Digital Fountain Approach to Reliable Distribution of Bulk Data," Proc. ACM SIGCOMM, ACM Press, New York, 1998, pp. 56-67.

Goyal, V.K., "Multiple Description Coding: Compression Meets the Network," IEEE Signal Processing Magazine, vol. 18, 2001, pp. 74-93.

Chu, et al., "A Case for End System Multicast," Proceedings ACM SIGMETRICS 2000: International Conference on Measurement and Modeling of Computer Systems, Jun. 17-21, 2001, pp. 1-12.

Rejaie, et al., "Architectural Considerations for Playback of Quality Adaptive Video Over the Internet," Proceedings IEEE International Conference on Networks, Sep. 2000, (pp. 204-209).

Wang, "Traffic Regulation under the Percentile-Based Pricing Policy," Proceedings of the First International Conference on Scalable Information Systems, Jun. 2006, (8 pages).

Duffield, et al. "Issues of Quality and Multiplexing When Smoothing Rate Adaptive Video," IEEE Transactions on Multimedia, vol. 1, No. 4, Dec. 1999, (13 pgs.).

(56) References Cited

OTHER PUBLICATIONS

Gürses, et al., "A Simple and Effective Mechanism for Stored Video Streaming with TCP Transport and Server-Side Adaptive Frame Discard," Computer Networks, 48, Dec. 30, 2004, (pp. 489-501).
Birney, "Intelligent Streaming," Inside Windows Media, Nov. 19, 1999, XP-002177089, (9 pgs.).
"Video Compression Picture Types," from Wikipedia, the free encyclopedia, http://en.wikipedia.org/w/index.php?title=Video_compression_picture_types&oldid=252563025, XP-002571418, printed Mar. 4, 2010, 5 pages.
Response to Office Action dated May 31, 2011, from U.S. Appl. No. 12/486,589, filed Aug. 31, 2011, 19 pp.
Carter, et al., "Dynamic Server Selection using Bandwidth Probing in Wide-Area Networks," Computer Science Department, Boston University, Mar. 18, 1996, 20 pp.
Office Action for U.S. Appl. No. 13/409,080, dated Sep. 21, 2012, 24 pages.
Notice of Allowance for U.S. Appl. No. 13/179,018, dated Jun. 25, 2012, 80 pages.
Notice of Allowance from U.S. Appl. No. 12/463,971, mailed Mar. 17, 2011, 23 pp.
Office Action for U.S. Appl. No. 13/179,018, dated Oct. 25, 2011, 20 pages.
Corrected Notice of Allowance from U.S. Appl. No. 12/486,589, dated Jan. 19, 2012, 11 pages.
Notice of Allowance for U.S. Appl. No. 13/409,080, dated Feb. 8, 2013, 20 pages.
Office Action for U.S. Appl. No. 13/626,463, dated Feb. 25, 2013, 18 pages.

\* cited by examiner

DYNAMIC MEDIA BIT RATES BASED ON ENTERPRISE DATA TRANSFER POLICIES

This application is a continuation of U.S. patent application Ser. No. 13/409,080 filed Feb. 29, 2012, entitled "DYNAMIC MEDIA BIT RATES BASED ON ENTERPRISE DATA TRANSFER POLICIES" which is a continuation of U.S. patent application Ser. No. 12/486,589 filed on Jun. 17, 2009, entitled "DYNAMIC MEDIA BIT RATES BASED ON ENTERPRISE DATA TRANSFER POLICIES," and U.S. Provisional Patent Application Serial No. 61/073,542 filed Jun. 18, 2008, entitled "DYNAMIC MEDIA BIT RATES BASED ON ENTERPRISE DATA TRANSFER POLICIES". The entireties of the aforementioned applications are incorporated herein by reference.

TECHNICAL FIELD

The invention relates to computer networks and particularly to downloading media data on computer networks.

BACKGROUND

Media content providers provide media content to users via one or more computer networks. For example, an operator of a web site may allow users to download homemade video clips via the Internet. In many situations, media content providers do not own or control the network through which users download media content provided by the media content providers. Thus, in order to provide media content to users, media content providers may make contracts with network service providers that own or control the networks. In such a contract, a network service provider that owns a network may allow the media content provider to send media content via the network in exchange for money and/or other services.

In many circumstances, a network service provider that owns a network may charge a media content provider an amount based on the number of bits that the media content provider sends through the network. For example, the network service provider may charge the media content provider $0.005 for each megabyte that the media content provider sends through the network. In a second example, the network service provider may use bandwidth utilization as a proxy indicator for the total usage of the media content provider through the network. In this second example, the network service provider and the media content provider may agree to a so-called "95/5" rule. In accordance with the "95/5" rule, the network service provider may sample at regular intervals the overall bandwidth utilization of the media content provider.

SUMMARY

In general, this disclosure describes techniques of dynamically selecting a media asset of media content based on data transfer policies of a media content provider that provides the media content. As described herein, a media content provider may establish a variety of data transfer policies for a variety of purposes. When requests are received, versions of media assets indicated by the requests are selected such that an overall bandwidth utilization of the media content provider is likely to be substantially equal to a desired bandwidth utilization specified by one or more of the data transfer policies.

In one example, a method comprises receiving at a media content provider (MCP) a request from a client device for a media asset. The MCP is capable of providing multiple versions of the media asset. Each of the versions of the media asset is associated with a different playback rate as measured in bits per second. The method further comprises selecting, in response to the request, one of the multiple versions of the media asset such that when the MCP transfers the selected version of the media asset to the client device over a network link an overall bandwidth utilization of the network link by the MCP is substantially equal to a desired overall bandwidth utilization indicated by a data transfer policy. The method further comprises transferring the selected version of the media asset from the MCP over the network link.

In another example, a device comprises a network interface at a media content provider (MCP) that receives a request from a client device for a media asset. The media content provider (MCP) is capable of providing multiple versions of the media asset. Each of the versions of the media asset is associated with a different playback rate as measured in bits per second. The device further comprises a version selection module (VSM) that: (i) selects, in response to the request, one of the multiple versions of the media asset for the client device such that when the MCP transfers the selected version of the media asset over a network link an overall bandwidth utilization of the network link by the MCP is substantially equal to a desired overall bandwidth utilization indicated by a data transfer policy stored in a data transfer policy module, and (ii) causes the selected version of the media asset to be transferred from the MCP over the network link.

In another example, a computer-readable storage medium comprises instructions that, when executed by one or more processors, cause the one or more processors to be able to receive at a media content provider (MCP) a request from a client device for a media asset. A media content provider (MCP) is capable of providing multiple versions of the media asset. Each of the versions of the media asset is associated with a different playback rate as measured in bits per second. In addition, the computer-readable storage medium comprises instructions to select, in response to the request, one of the multiple versions of the media asset such that when the MCP transfers the selected version of the media asset over a network link an overall bandwidth utilization of the network link by MCP is substantially equal to a desired overall bandwidth utilization indicated by a data transfer policy. Furthermore, the computer-readable storage medium comprises program instructions to transfer the selected version of the media asset from the MCP over the network.

In one example, a device comprises means for receiving at a media content provider (MCP) a request from a client device for a media asset. The MCP is capable of providing multiple versions of the media asset. Each of the versions of the media asset is associated with different playback rate as measured in bits per second. The device further comprises means for selecting, in response to the request, one of the multiple versions of the media asset such that when the MCP transfers the selected version of the media asset to the client device over a network link an overall bandwidth utilization of the network link by the MCP is substantially equal to a desired overall bandwidth utilization indicated by a data transfer policy. The device further comprises means for transferring the selected version of the media asset from the MCP over the network link.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
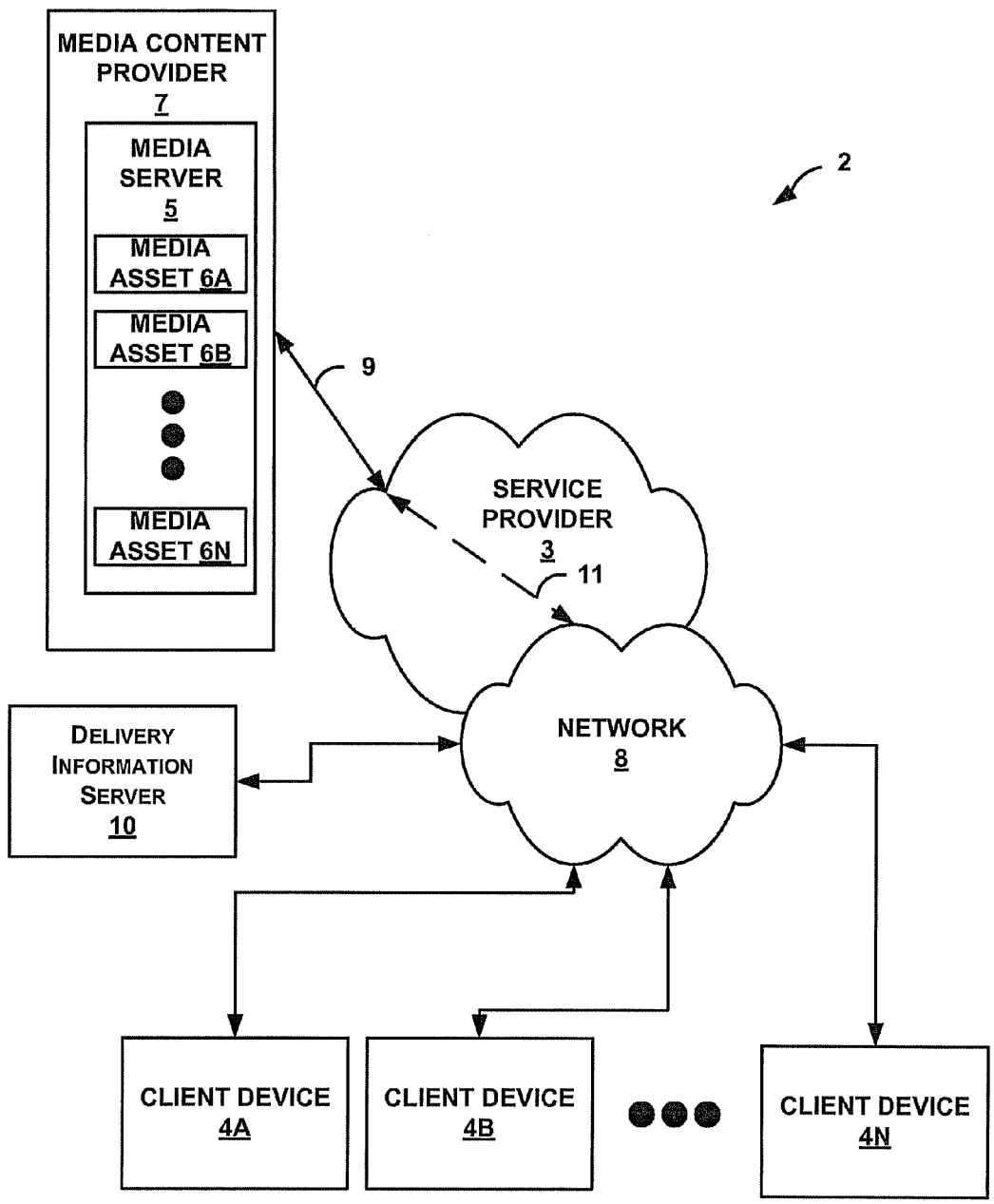
FIG. 1 is a schematic diagram illustrating an exemplary system for transmitting media content.

FIG. 1 is a schematic diagram illustrating an exemplary system 2 for transmitting media content. System 2 includes a media content provider (MCP) 7, service provider 3, network 8, delivery information server 10, and client device 4A-4N (collectively client devices 4). Client devices 4 may be a wide variety of different types of devices. For example, each one of client devices 4 may be a personal computer, a laptop computer, a mobile telephone, a personal media player, a device integrated into a vehicle, a network telephone, a network television, a television set-top box, a network appliance, or another type of network device.

MCP 7 transmits media content to client devices 4 via network 8. MCP 7 transmits media content via network access link 9 to service provider 3, e.g., a T3 line. Network link 9 may be one dedicated link to service provider 3, or may be a plurality of links from MCP 7 to service provider 3. Service provider 3 provides service provider network infrastructure 11 to forward the media content to network 8. The bandwidth that MCP 7 utilizes to transmit media content through network link 9 to service provider 3 is referred to as the overall bandwidth utilization. Traditionally, the overall bandwidth utilization may be determined by the number of client devices 4 downloading from MCP 7. The more client devices 4 that are downloading media content from MCP 7 at the same time translates into a high bandwidth utilization. Similarly, the fewer client devices 4 that are downloading media content from MCP 7 at the same times translates into a low bandwidth utilization. MCP 7 may be an enterprise or other organization. For example, MCP 7 may be a corporation that runs a web site that allows users to post and share video clips.

MCP 7 includes media server 5. The media content is stored as a media asset in media server 5. As used in this disclosure, a "media asset" is a set of media data (e.g., a media file) that each one of client devices 4 can download and play back via a media player. Example media assets include video clips, audio clips, movies, live audio streams, live video streams, teleconference streams, telephone streams, digital cinema feeds, and other types of media. Examples of media players include Windows Media Player™ or Silverlight™ from Microsoft Corporation of Redmond, Wash., Quicktime™ from Apple Computer of Cupertino, Calif., and Flash Video™ from Adobe Systems, Inc. of San Jose, Calif.

Network 8 may be a wide variety of different types of networks. For example, network 8 may be the Internet, a content delivery network, a wide-area network, or another type of network. In some situations, MCP 7 does not own or control network 8. In such situations, service provider 3 owns and controls network 8. MCP 7 makes contracts with service provider 3 to allow MCP 7 to provide media assets to client devices 4 via network 8 and possibly one or more additional intermediate networks. For example, MCP 7 makes contract to lease network line 11. In return, service provider 3 charges MCP 7 money for use of network 8. Service provider 3 may charge MCP 7 based on the overall bandwidth utilization of network 8 by MCP 7, i.e. service provider 3 charges MCP 7 based on the overall bandwidth utilization of network link 9 by MCP 7. Generally, service provider 3 charges MCP 7 a higher price for high bandwidth utilization, and a lower price for low bandwidth utilization. In one example, network 8 represents one or more high-speed network access links or other network connections provided and maintained by service provider 3 and leased by MCP 7.

Service provider 3 may charge MCP 7 based on the "95/5" rule. In accordance with the 95/5 rule, service provider 3 determines the overall bandwidth utilization over network link 9 by MCP 7 at certain time intervals over a billing period. As a first example, service provider 3 determines the number of bits transmitted by MCP 7 during a 5 minute interval. Service provider 3 divides the number of bits transmitted by MCP 7 during the 5 minute interval by 5 minutes to determine an overall bandwidth utilization by MCP 7. Service provider 3 then stores the determined overall bandwidth utilization as one sample. Service provider 3 repeats this step every 5 minutes over a billing period. A billing period may be a month of time. As a second example, every 5 minutes service provider 3 determines the number of bits transmitted during the last second. Service provider 3 multiplies the determined number of transmitted bits by 300 to estimate the number of bits transmitted during a 5 minute interval (300 seconds in 5 minutes). Service provider 3 divides the estimated number of bits transmitted during a 5 minute interval by 5 minutes to calculate a sample of the overall bandwidth utilization during the 5 minute interval. Service provider 3 repeats this step every 5 minutes over a billing period, i.e. a month. Generally, service provider 3 performs the steps of the first example. In either example, service provider 3 then uses the samples of the overall bandwidth utilization to identify the $95^{th}$ percentile of the overall bandwidth utilization. Service provider 3 charges MCP 7 based on the bandwidth utilization of the identified $95^{th}$ percentile.

For example, assume service provider 3 charges MCP 7 monthly. Over a 30 day period, service provider 3 samples the overall bandwidth utilization of MCP 7 every 5 minutes. This yields to 8640 samples of the overall bandwidth utilization (30 days multiplied by 24 hours per day multiplied by 60 minutes per hour divided by 5 minutes per sample). Service provider 3 disregards 432 samples that correspond to when MCP 7 had the highest overall bandwidth utilization (8640 multiplied by 0.05). Service provider 3 determines the highest overall bandwidth utilization in the remaining 8208 samples, i.e. the $95^{th}$ percentile, (8640 samples minus 432 samples) and charges MCP 7 based on the determined highest overall bandwidth utilization in the remaining 8208 samples, i.e. the $95^{th}$ percentile of the overall bandwidth utilization. The sample rate of 5 minutes and the time period of 30 days is just one example. Service provider 3 may sample the overall bandwidth utilization at different time intervals and the time period may be different as well. Also the 95/5 rule is one example; service provider 3 may have a different contract with MCP 7. For example, service provider 3 may charge MCP 7 based on the $90^{th}$ percentile of the overall bandwidth utilization instead of the $95^{th}$ percentile of the overall bandwidth utilization. For clarity and ease of description, the various embodiments described herein will be based on the 95/5 rule where service provider 3 samples the overall bandwidth utilization every 5 minutes and the billing period is one month.

Each one of client devices 4 downloads a media asset via network 8. To download a media asset each one of client devices 4 may output a request for the media asset to delivery information server 10. The request may specify a resource identifier of the media asset. For example, each one of client devices 4 outputs a Hypertext Transfer Protocol (HTTP) request that specifies a Uniform Resource Locator (URL) of the media asset. Delivery information server 10 may or may not be operated by MCP 7. For example, delivery information server 10 may be operated by a third party. In other words, delivery information server 10 may be operated by a service that is independent of MCP 7.

Delivery information server 10 may be configured to implement a data transfer policy established by MCP 7. The data transfer policy may indicate a desired overall bandwidth utilization for a billing period. As one example, a data transfer policy may indicate that MCP 7 wants to maintain an overall bandwidth utilization of 100 mega-bits per second for the billing period. There may be other types of data transfer policies as well. Other examples of data transfer policies are described in more detail below.

It is important to reiterate that service provider 3 will charge MCP 7 at the $95^{th}$ percentile of the overall bandwidth utilization regardless of the $94^{th}$ percentile of the overall bandwidth utilization. Traditionally, this may require MCP 7 to pay a very high price without any benefit. For example, assume that for 28 days out of the 30 days the overall bandwidth utilization of MCP 7 was 1 mega-bit per second per day. For 2 days out of the 30 days the overall bandwidth utilization of MCP 7 was 100 mega-bits per second per day due to a lot of client devices 4 downloading from MCP 7 at the same time. In those two days when MCP 7 was utilizing bandwidth of 100 mega-bits per second, service provider 3 took 576 samples, assuming service provider 3 took samples every 5 minutes. After service provider 3 disregards the 432 highest overall bandwidth utilization samples, i.e. disregards the $5^{th}$ percentile, there are still 144 samples that correspond to an overall bandwidth utilization of 100 mega-bits per second. Therefore, the $95^{th}$ percentile of the overall bandwidth utilization during the 30 day period is 100 mega-bits per second.

In this example, service provider 3 will charge MCP 7 based on an overall bandwidth utilization of 100 mega-bits per second even though for 28 days out of the 30 days MCP 7 only utilized bandwidth of 1 mega-bit per second. MCP 7 could have utilized bandwidth of 100 mega-bits per second for the entire billing period without incurring any additional costs.

In one example embodiment of the invention, MCP 7 transmits media assets to client devices 4 such that the $95^{th}$ percentile of the overall bandwidth utilization is less than some desired overall bandwidth utilization during the billing period of service provider 3. For example, MCP 7 may only want to pay service provider 3 the charge associated with bandwidth utilization of 2 giga-bits per second for the billing period. In such an example embodiment, MCP 7 will transmit a media asset to client devices 4 such that the $95^{th}$ percentile of overall bandwidth utilization is less than or equal to 2 giga-bits per second for the billing period. Delivery information server 10 may store the transfer policy that the overall bandwidth utilization of MCP 7 will be less than or equal to 2 giga-bits per second.

In another example embodiment of the invention, MCP 7 may estimate the $95^{th}$ percentile of the overall bandwidth utilization for a given period of time. The estimated $95^{th}$ percentile may be the desired overall bandwidth utilization. In such embodiments, MCP 7 transmits a media asset to client devices 4 such that the $95^{th}$ percentile of the overall bandwidth utilization for the billing period is less than or equal to the desired overall bandwidth utilization. MCP 7 may estimate the $95^{th}$ percentile of the overall bandwidth utilization for the billing period based on various factors such as the historical $95^{th}$ percentile of the overall bandwidth utilization or some predictable future event that will require a certain overall bandwidth utilization over a period of time.

For example, assuming a billing period of one month, MCP 7 may estimate that for 20 days out of the month the overall bandwidth utilization will be 1 giga-bit per second, and for 10 days out of the month the overall bandwidth utilization will be 2 giga-bits per second. In this example, the estimated $95^{th}$ percentile of the overall bandwidth utilization will be 2 giga-bits per second. This is because after service provider 3 disregards the highest $5^{th}$ percentile of the overall bandwidth utilization, the $95^{th}$ percentile will be 2 giga-bits per second. In such an example embodiment, MCP 7 transmits a media asset to client devices 4 such that the overall bandwidth utilization is greater than 1 giga-bit per second, but less than or equal to 2 giga-bits per second, during the 20 days that MCP 7 estimated that the bandwidth utilization will be 1 giga-bit per second. This is because MCP 7 will not incur any additional costs by transmitting media assets such that the overall bandwidth utilization is higher than 1 mega-bit per second, but less than or equal to 2 giga-bits per second, since the estimated cost incurred by MCP 7 will be based on the 2 giga-bits per second overall bandwidth utilization that MCP 7 estimated for the 10 days out of the month. Delivery information server 10 may store the estimated transfer policy for MCP 7.

In yet another example embodiment, MPC 7 transmits media assets based on an overall bandwidth utilization established during the billing period. For example, assuming a one month billing period, for the first 10 days of the month MPC 7 had an overall bandwidth utilization of 1 giga-bit per second. During the $11^{th}$ and $12^{th}$ days of the month, a lot of client devices 4 downloaded a media asset from MPC 7 requiring MPC 7 to transmit media assets such that the overall bandwidth utilization was at 2 giga-bits per second. For the remaining 18 days of the billing period, MPC 7 will transmit media assets to client devices 4 such that the overall bandwidth utilization is at least 2 giga-bits per second because the charge for the billing period will already be set by day 11 and 12 and MPC7 incurs no additional costs by maintaining an overall bandwidth utilization of 2 giga-bits per second. In this example, if only on day 11 of the billing period the overall bandwidth utilization increased to 2 giga-bits per second, MPC 7 may not transmit media assets such that the overall bandwidth utilization is 2 giga-bits per second for the remaining days of the billing period. This is because the 2 giga-bits per second bandwidth utilization for just one day will not set the price for the entire billing period.

In different embodiments, MPC 7 transmits media assets that are encoded for different playback rates to generate the desired overall bandwidth utilization. The playback rate is defined as the rate at which a media player on each one of client devices 4 displays the media asset. The media assets comprise substantially similar media content but are played back by the media player at different playback rates. Media assets that comprise the same media content but are encoded for different playback rates require MPC 7 to consume different amounts of bandwidth to transmit the media assets as described in more detail below. Media assets that are encoded for higher playback rates but comprise the same media content require MPC 7 to utilize more bandwidth for transmission than media assets that are encoded for lower playback rates. As described in more detail below, in some non-limiting examples, delivery information server 10 selects the version of the media asset that media server 5 should transmit. By selecting media assets that are encoded for different playback rates, MPC 7 can adjust the amount of bandwidth utilization.

MPC 7 may calculate the bandwidth that is required to transmit the various media assets after the media assets are compressed. In some examples, after a media asset is encoded for a certain playback rate, the media asset may be further encoded before the media asset is transmitted. The additional encoding may compress the media asset. If there are minimal visual changes in a portion of the media asset, well known compression techniques may be capable of greatly compressing the media content. For example, 5 mega-bits of media content for minimal visual changes may be compressed to 1 mega-bit of media content. Conversely, if there are rapid visual changes in a portion of the media asset, that portion of the media asset may not compress as well. For example, 5 mega-bits of media content for rapid visual changes may only compress to 4 mega-bits.

MCP 7 may determine the bandwidth required to transmit the various media assets. As described above, media assets encoded for higher playback rates require more bandwidth for transmission than media assets encoded for lower playback rates that comprise the same media content. In accordance with this disclosure, MCP 7 selects media assets for transmission to client devices 4 that are encoded for different playback rates to control the bandwidth MCP 7 utilizes.

There may be other techniques to calculate the bandwidth required to transmit the media assets for uninterrupted playback. As described above, to calculate the bandwidth required to transmit a media asset, MCP 7 divides the total number of bits by the playback duration of the media asset. In some other examples, MCP 7 may divide the media assets into various portions and determine the bandwidth necessary to transmit the various portions of the media asset. This technique is described in more detail below.

It is important to differentiate the playback rate from a transfer rate. The transfer rate is the average rate measured in bits per second at which each one of client devices 4 is downloading media assets from media server 5. Playback rate is the rate at which a media player in each one of the client devices 4 displays the media asset. Similarly, it is important to differentiate the bandwidth required to transmit the media assets and the playback rate of the media assets. Again, the playback rate of the media assets is the rate at which the media player displays the media asset. The bandwidth required to transmit the media asset is the number of bits per second of the media asset that media server 5 transmits.

The media player executing on each one of client devices 4 receives the media assets and decodes the media assets. After decoding, the media player plays the media assets at their specified playback rates. However, the bandwidth required to receive the media assets may be different than the playback rate.

To reiterate, MPC 7 stores a plurality of media assets that each contain substantially similar media content but are encoded for different playback rates. As shown in FIG. 1, media server 5 stores a plurality of media assets 6A-6N (collectively media assets 6). Each one of media assets 6 includes substantially similar content. However, media server 5 utilizes different amounts of bandwidth to transmit each one of media assets 6. In other words, each one of media assets 6 are encoded in a manner that require different amounts of bandwidth for media server 5 to transmit them. Media assets 6 that are encoded for higher playback rates may require media server 5 to utilize more bandwidth to transmit those media assets 6 compared to media assets 6 that are encoded for lower playback rates. For example, media asset 6A is encoded in a manner that requires media server 5 to utilize an average of 1 Mbps to transmit media asset 6A. Media asset 6B is encoded in a manner that requires media server 5 to utilize an average of 2 Mbps to transmit media asset 6B, as one example. A media asset that is encoded for a high playback rate requires more data bits that MCP 7 needs to transmit as compared to a media asset that is encoded for a low playback rate. This is because the number of bits that need to be transferred in order to represent one second of playback for a high playback rate media asset may be greater than the number of bits that need to be transferred in order to represent one second of playback for a low playback rate media asset. In some embodiments, a media asset that is encoded for a high playback rate provides higher quality video content compared to a media asset that is encoded for a low playback rate.

In the context of video, each of media assets 6 typically contains a plurality of video frames encoded in accordance with a video compression scheme. One type of frame is referred to as a key frame or intra picture that can be decoded without reference to other frames and may, for example, provide an entire encoded picture. The term "key frame" is used herein to generally refer to this type of frame within an encoded media stream. In the context of H.264 coding, key frames are referred to as "i-frames." Between each key frame are predicted pictures or bi-predicted pictures that generally contain image data and motion vector displacements that are relative to the previous key frame in the media file.

In some examples, after media server 5 calculates the bandwidth required to transmit the versions of the media assets encoded for different playback rates, media server 5 may provide the data regarding the bandwidth required to transmit each version of the media asset to delivery information server 10. Delivery information server 10 then stores the bandwidth requirement information. Alternatively, delivery information server 10 calculates the bandwidth required to transmit each version of the media asset similar to techniques described above with respect to media server 5.

When delivery information server 10 receives a request from one of client devices 4 that indicates a media asset, delivery information server 10 may, in response to the request, determine how much bandwidth MCP 7 can utilize without violating the overall bandwidth utilization policy. Delivery information server 10 then selects a version of the media asset from the plurality of media assets 6 such that when MCP 7 transfers the version of the media asset, the overall bandwidth utilization of MCP 7 substantially meets the conditions of the desired transfer policy. After delivery information server 10 selects the version of the media asset, delivery information server 10 may cause MCP 7 to transfer the selected version of the media asset. Delivery information server 10 may cause MCP 7 to transfer the selected version of the media asset in a variety of ways. For example, delivery information server 10 may send a message to one of client devices 4, for example client device 4A, that directly or indirectly indicates the playback rate of the selected version of the media asset. When client device 4A receives the message from delivery information server 10, client device 4A may cause network 8 to output a request to media server 5 for a version of the media asset having the selected playback rate. For example, delivery information server 10 may send a message to client device 4A that specifies the selected playback rate, thereby directly indicating the selected playback rate. In this example, client device 4A may send a request to media server 5 that specifies a resource identifier of the media asset and the selected playback rate. In another example, delivery information server 10 may send a message to client device 4A that specifies a resource identifier associated with a version of the media asset having the selected playback rate.

In an alternative implementation, one of client devices 4, for example client device 4B, may output a request for the media asset to media server 5. The request may specify a resource identifier of the media asset. When media server 5 receives the request, media server 5 may send a request to delivery information server 10 for information regarding how much bandwidth media server 5 can utilize without violating the overall bandwidth utilization policy. Delivery information server 10 may transmit back to media server 5 information regarding the amount of bandwidth media server 5 can utilize. Media server 5 may then select a version of the media asset based on the bandwidth that media server 5 can utilize without violating the overall bandwidth utilization policy. Media server 5 may select the version of the media asset encoded for a certain playback rate such that the bandwidth required to transfer the selected version does not violate the overall bandwidth utilization policy. Media server 5 may then send a version of the requested media asset having the selected playback rate to client device 4B.

Figure 2A:
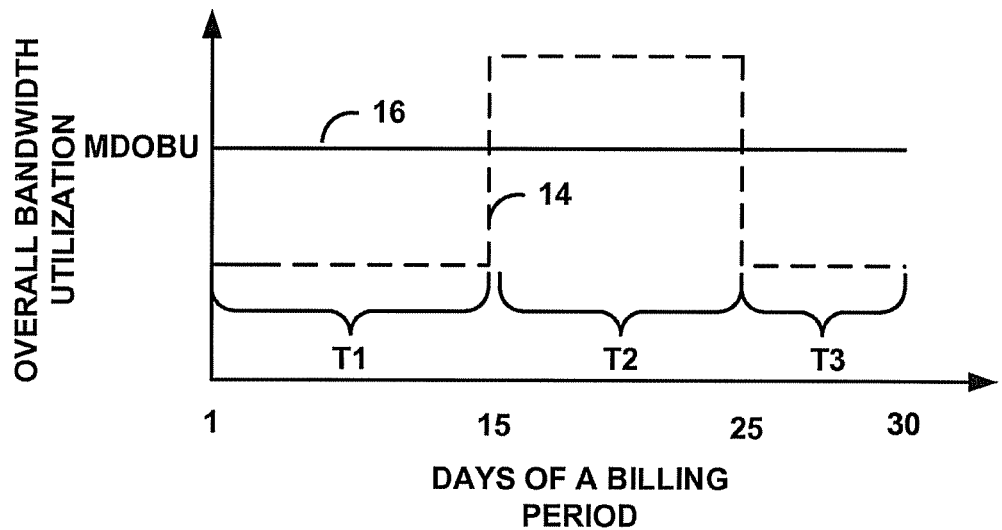
FIGS. 2A-2C are timing diagrams illustrating examples of MCP transmitting media assets at are encoded for different playback rates to generate a desired overall bandwidth utilization.

FIG. 2A is a timing diagram illustrating one example of MCP 7 transmitting different versions of media assets 6 that are encoded for different playback rates to generate a desired overall bandwidth utilization. As described above, media assets 6 that are encoded for different playback rates require MCP 7 to utilize different amounts of bandwidth to transmit the media assets to achieve real-time playback without interruption. For example, referring back to FIG. 1, assume media asset 6A and media asset 6B are encoded for different playback rates. Further assume media asset 6A is encoded in a manner that requires media server 5 to utilize 1 Mbps of bandwidth to transmit media asset 6A and media asset 6B is encoded in a manner that requires media server 5 to utilize 2 Mbps of bandwidth to transmit media asset 6B. The overall bandwidth utilization of media server 5 is the sum of the bandwidths of the media assets that are currently being transmitted. Keeping with the previous example, if media server 5 is simultaneously transmitting only media asset 6A and media asset 6B, then the overall bandwidth utilization of media server 5 is 3 Mbps during the transmission of media assets 6A and 6B.

As shown in FIG. 2A, bandwidth utilization 14 is one example of an overall bandwidth utilization of MCP 7 in a traditional system. Bandwidth utilization 16 is one example of an overall bandwidth utilization of MCP 7 according to one embodiment of the invention. Bandwidth utilization 14 and bandwidth utilization 16 are just one example. Bandwidth utilization 14 and bandwidth utilization 16 are provided for illustration and clarity purposes. Bandwidth utilization 14 and bandwidth utilization 16 may be different in different embodiments. As shown in FIG. 2A, the $95^{th}$ percentile of the maximum desired overall bandwidth utilization (MDOBU) is labeled as MDOBU. For illustrative purposes, assume that MDOBU is 150 mega-bits per second.

In the traditional system shown by bandwidth utilization 14, from day one of the billing period to day fifteen of the billing period (T1) assume there are 100 client devices 4 each downloading media assets from MCP 7. Client devices 4 are downloading media assets so that the overall bandwidth utilization of MCP 7 is 100 mega-bits per second. Then on day fifteen to day twenty-five (T2) 200 client devices 4 started downloading media assets from MCP 7 such that the overall bandwidth utilization increased to 200 mega-bits per second. Subsequently, from day twenty-five to thirty (T3), there are only 100 client devices 4 downloading from MCP 7 such that the overall bandwidth utilization is 100 mega-bits per second.

In the traditional system, MCP 7 will be charged based on an overall bandwidth utilization of 200 mega-bits per second. The $95^{th}$ percentile of the overall bandwidth utilization will be 200 mega-bits per second during the billing period because service provider 3 would have taken more than 432 samples of the overall bandwidth utilization when the overall bandwidth utilization was 200 mega-bits per second. To reiterate the calculation for the $95^{th}$ percentile, during the 30 day billing period, service provider 3 sampled the overall bandwidth utilization of MCP 7 8640 times. The highest overall bandwidth utilization occurred during the entire duration of T2, i.e. 10 days. During T2, service provider 3 sampled the overall bandwidth utilization of MCP 7 2880 times. Disregarding 432 samples that correspond to the highest overall bandwidth utilization, there are still 2448 samples of the 8208 remaining samples that correspond to an overall bandwidth utilization of 200 mega-bits per second. Therefore the highest overall bandwidth utilization corresponding to the remaining 8208 samples is 200 mega-bits per second, and MCP 7 will have to pay service provider 3 the charge associated with 200 mega-bits per second.

However, as noted above, MCP 7 desired to limit the $95^{th}$ percentile of the overall bandwidth utilization to 150 mega-bits per second because MCP 7 did not want to pay more than the charge associated with a bandwidth utilization of 150 mega-bits per second. The charge associated with the $95^{th}$ percentile of the overall bandwidth utilization of 150 mega-bits per second may be less than the charge associated with the $95^{th}$ percentile of the overall bandwidth utilization of 200 mega-bits per second. Therefore in the traditional system, MCP 7 was required to pay more than it desired.

Bandwidth utilization 16 shows one example of the overall bandwidth utilization of MCP 7 according to one embodiment of the invention. As before, during T1 there are a 100 client devices 4 attempting to download media assets 6 from MCP 7. In this example embodiment, each one of client devices 4 transmits a request to delivery information server 10 to download the media content. As noted above, each one of media assets 6 includes the same media content, however, each one of media assets 6 may be played back at different playback rates. Furthermore, MCP 7 utilizes different amounts of bandwidth to transmit different versions of media assets 6. Delivery information server 10 determines that MCP 7 wants to maintain 150 mega-bits per second as the $95^{th}$ percentile of the overall bandwidth utilization (MDOBU) based on the delivery transfer policy stored within delivery information server 10. Delivery information server 10 will select versions of media assets 6 for the 100 client devices 4 such that when MCP 7 transmits the versions of media assets 6 to the 100 client devices 4, the overall bandwidth utilization meets the conditions of the delivery transfer policy, i.e. do not exceed 150 mega-bits per second.

During T2, there are 200 client devices 4 attempting to download media assets. Delivery information server 10 will select versions of media assets 6 for each one of the 200 client devices 4 such that when MCP 7 transmits the versions of media assets 6 to each one of the 200 client devices 4, the overall bandwidth utilization is equal to 150 mega-bits per second. During T3, there are 100 client devices 4 attempting to download media assets. Similar to T1 and T2, delivery information server 10 will select versions of media assets 6 for each one of the 100 client devices 4 such that when MCP 7 transmits the versions of media assets 6 to each one of the 100 client devices 4, the overall bandwidth utilization does not exceed 150 mega-bits per second.

In this manner, the $95^{th}$ percentile of the overall bandwidth utilization will not be greater than 150 mega-bits per second. Service provider 3 will charge MCP 7 based on the overall bandwidth utilization that is less than or equal to 150 mega-bits per second. In this embodiment, MCP 7 saves money compared to the traditional system because in accordance with the invention, MCP 7 pays service provider 3 based on a bandwidth utilization of 150 mega-bits per second. While in the traditional system MCP 7 would have paid based on a bandwidth utilization of 200 mega-bits per second.

Figure 2B:
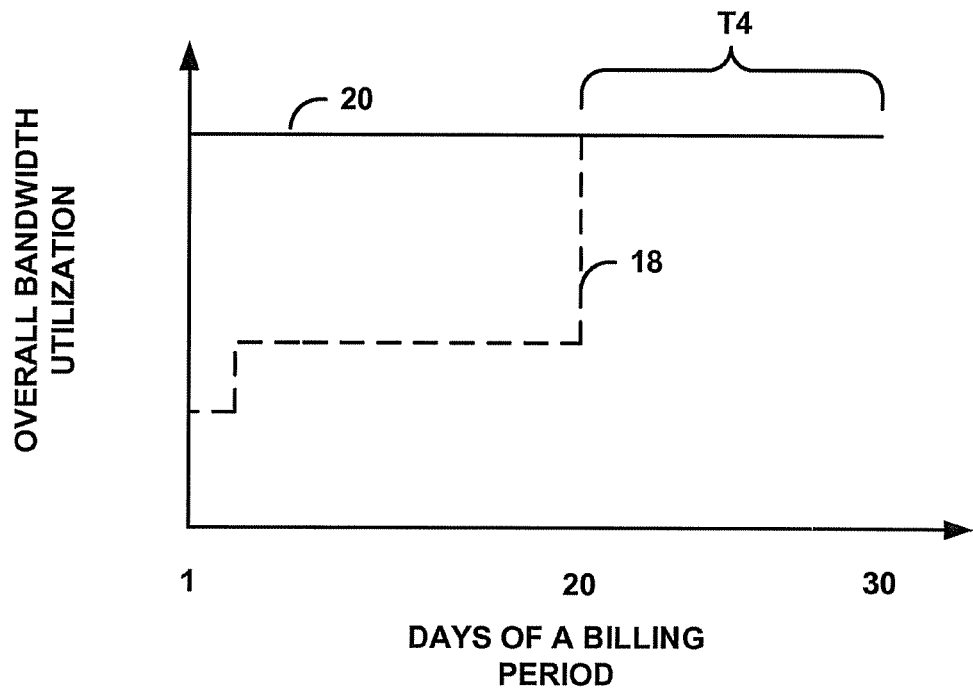

FIG. 2B is another timing diagram illustrating another example of MCP 7 transmitting different versions of media assets 6 that are encoded for different playback rates to generate a desired overall bandwidth utilization. As shown in FIG. 2B, estimate bandwidth utilization 18 is an example of an estimate of the overall bandwidth utilization of MCP 7 over a billing period. Estimate bandwidth utilization 18 may be estimated by MCP 7 by various techniques. For example, MCP 7 takes an average of the overall bandwidth utilization for the previous billing periods and estimates the bandwidth utilization of the current billing period based on the historical overall bandwidth utilization. As another example, MCP 7 has knowledge of some subsequent event that will require a large overall bandwidth utilization. For example, MCP 7 plans on providing media content that it predicts will be viewed by many client devices 4, and estimates that its overall bandwidth utilization will need to increase to allow client devices 4 to view the media content.

As shown in FIG. 2B, MCP 7 predicts that from day 20 to day 30 (T4) of the billing period, the overall bandwidth utilization will be the highest. Therefore, the estimated charge for the billing period will be set by the estimated overall bandwidth utilization during T4. Delivery information server 10 may store as the delivery transfer policy the estimated overall bandwidth utilization. Since the charge for the billing period will be set by the bandwidth utilization during T4, in one embodiment, delivery information server 10 causes MCP 7 to transmit versions of the media assets 6 to client devices 4 during day 1 to day 20 such that the overall bandwidth utilization is less than or equal to the estimated overall bandwidth utilization during T4, as shown by bandwidth utilization 20. Delivery information server 10 will select versions of media assets 6 for each one of client devices 4 such that when MCP 7 transmits the versions of media assets 6 to each one client devices 4, the overall bandwidth utilization is less than or equal to the estimated overall bandwidth utilization. In this manner, each one of client devices 4 downloads media assets that provide better visual quality compared to the traditional system, and MCP 7 incurs no additional costs.

Figure 2C:
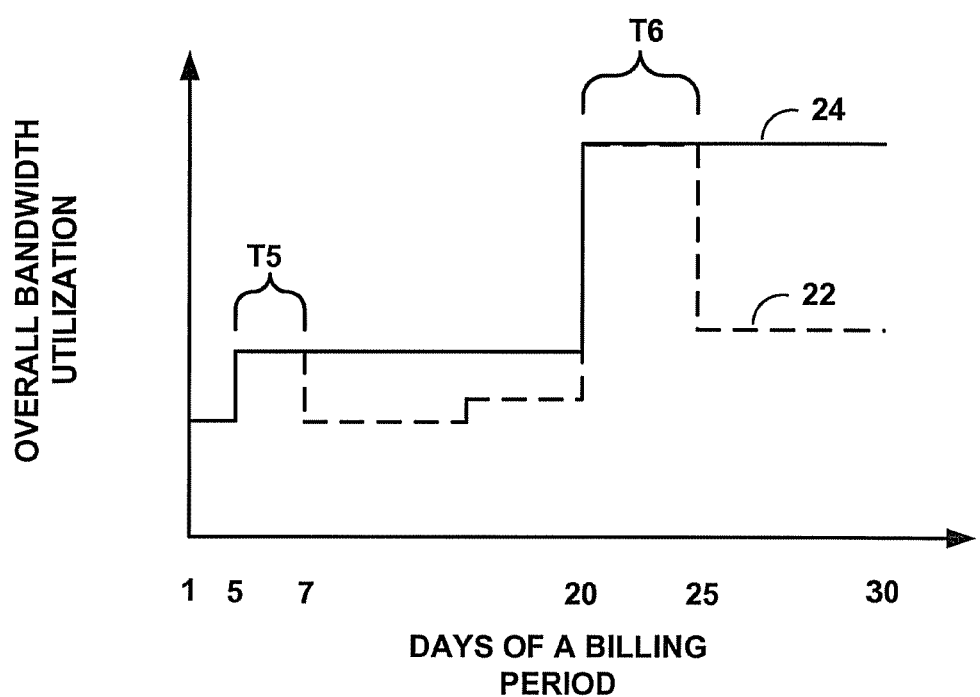

FIG. 2C is another timing diagram illustrating another example of MCP 7 transmitting different versions of media assets 6 that are encoded for different playback rates to generate a desired overall bandwidth utilization. As shown in FIG. 2C, bandwidth utilization 22 is one example of an overall bandwidth utilization of MCP 7 in a traditional system. Bandwidth utilization 24 is one example of an overall bandwidth utilization of MCP 7 according to one embodiment of the invention. Bandwidth utilization 22 and bandwidth utilization 24 are just one example. Bandwidth utilization 22 and bandwidth utilization 24 are provided for illustration and clarity purposes. Bandwidth utilization 22 and bandwidth utilization 24 may be different in different embodiments.

According to the traditional system as shown by bandwidth utilization 22, MCP 7 will change the overall bandwidth utilization based on the number of client devices 4 attempting to download from MCP 7. For example, the more client devices 4 that are downloading from MCP 7 translates into a higher overall bandwidth utilization and the fewer client devices 4 that are downloading from MCP 7 translates into a lower overall bandwidth utilization. For purposes of illustration, assume that the $95^{th}$ percentile of the overall bandwidth utilization is set by the overall bandwidth utilization during the duration of T6. Therefore, MCP 7 will pay based on the charge associated with the overall bandwidth utilization during the duration of T6.

In one example embodiment of the invention, MCP 7 will increase the overall bandwidth utilization for the remainder of the billing period when delivery information server 10 determines that there are enough samples of the overall bandwidth utilization to define the highest $5^{th}$ percentile of the overall bandwidth utilization. MCP 7 will increase the overall bandwidth utilization to at least the bandwidth utilization that defines the highest $5^{th}$ percentile for the remainder of the billing period. Delivery information server 10 may track the overall bandwidth utilization of MCP 7 to determine when enough samples have been taken to define the highest $5^{th}$ percentile of the overall bandwidth utilization. For example, delivery information server 10 may sample the overall bandwidth utilization substantially similar to service provider 3. The data transfer policy stored in delivery information server 10 may include information about the technique used by service provider 3 to sample the overall bandwidth utilization.

As shown by bandwidth utilization 24, between day 5 and 7 (T5) of the billing period, the overall bandwidth utilization increased due to many client devices 4 downloading from MCP 7 at the same time. The overall bandwidth utilization during T5 will set the charge that MCP 7 needs to pay service provider 3 if the overall bandwidth utilization does not increase. In accordance with the invention, delivery information server 10 will cause MCP 7 to provide versions of media assets 6 to client devices 4 such that the overall bandwidth utilization for the remainder of the billing period is at least the overall bandwidth utilization during T5.

In some instances, the overall bandwidth utilization may need to be greater than the overall bandwidth utilization during T5. As further shown by bandwidth utilization 24, between day 20 and 25 (T6) of the billing period, the overall bandwidth utilization increased again due to many more client devices 4 downloading from MCP 7 at the same time. The overall bandwidth utilization during T6 will set the charge that MCP 7 needs to pay service provider 3 if the overall bandwidth utilization does not increase. In accordance with the invention, delivery information server 10 will cause MCP 7 to provide versions of media assets 6 to client devices 4 such that the overall bandwidth utilization for the remainder of the billing period is at least the overall bandwidth utilization during T6.

Figure 3:
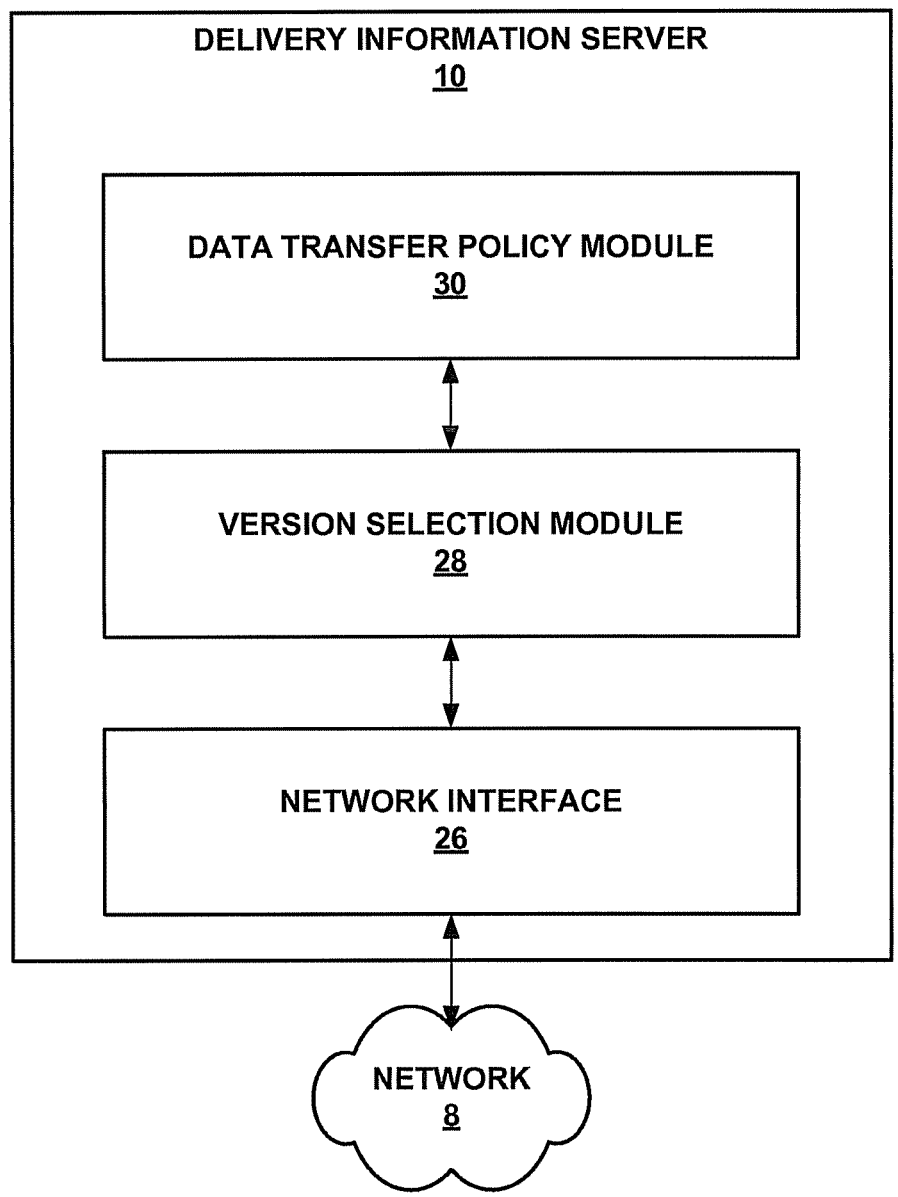
FIG. 3 is an example embodiment of various components of a delivery information server.

FIG. 3 is an example embodiment of various components of delivery information server 10. As illustrated in the example of FIG. 3, delivery information server 10 includes a network interface 26 that facilitates communication between delivery information server 10 and network 8. Network interface 26 may be an Ethernet interface, a WiFi interface, a WiMax interface, a fiber optic interface, or another type of network interface.

Network interface 26 may receive, via network 8, a request for information that indicates a playback rate of a media asset. For instance, network interface 26 may receive a request from each one of client devices 4, via network 8, for a URL associated with a version of the media asset. In another instance, network interface 40 may receive a request from media server 5, via network 8, for a playback rate of the media asset.

When network interface 26 receives the request, network interface 26 may provide the request to a version selection module (VSM) 28. Upon receiving the request, VSM 28 may select a version of a media asset indicated by the request. VSM 28 selects a version of the media asset from the versions of the media assets 6 based on a data transfer policy stored in data transfer policy module 30.

As illustrated in the example of FIG. 3, a data transfer policy module 30 may store data transfer policies of MCP 7. Data transfer policy module 30 may store a wide variety of data transfer policies that serve a wide variety of business purposes. For example, MCP 7 may wish to keep the overall bandwidth utilization for the billing period below some desired overall bandwidth utilization.

In this example, data transfer policy module 30 may store a data transfer policy of MCP 7 that specifies that the desired bandwidth utilization is equal to the $90^{th}$ percentile of the sampled bandwidth utilization during the billing period. The desired overall bandwidth utilization may be equal to the $90^{th}$ percentile in order to reduce the possibility that the actual overall bandwidth utilization of MCP 7 exceeds the $95^{th}$ percentile of the actual overall bandwidth utilization. When VSM 28 receives the request, VSM 28 may select a version of the media asset for each one of client devices 4 such that when MCP 7 transmits the versions of the media assets to client devices 4, the anticipated overall bandwidth utilization of MCP 7 is substantially equal to the $90^{th}$ percentile of the sampled overall bandwidth utilization during a transfer period of the version. As a result, when the anticipated overall bandwidth utilization of MCP 7 is approaching the $90^{th}$ percentile of the MCP's sampled bandwidth utilization for the current billing period, VSM 28 may select versions of media assets encoded for lower playback rates for subsequent client devices 4. This helps to insure that the overall bandwidth utilization is less than or equal to the desired overall bandwidth utilization. Hence, in this example, when VSM 28 receives the request, VSM 28 may estimate the current overall bandwidth utilization of MCP 7 and compare the current overall bandwidth utilization with the $90^{th}$ percentile of the sampled overall bandwidth utilization. If the current overall bandwidth utilization is significantly less than the $90^{th}$ percentile of the sampled overall bandwidth utilization, VSM 28 may select a version of the media asset that is encoded for a highest available playback rate. In other words, VSM 28 selects a version of the media asset that causes media server 5 to utilize the most amount of bandwidth to achieve uninterrupted playback as compared to the amount of bandwidth media server 5 would utilize to transmit any one of the rest of the media assets. If the current overall bandwidth utilization is close to or exceeds the $95^{th}$ percentile of the sampled overall bandwidth utilization, VSM 28 may select a version of the media asset that is encoded for a lower playback rate. In other words, VSM 28 selects a version of the media asset that causes media server 5 to utilize less bandwidth as compared to the amount of bandwidth media server 5 would utilize to transmit the current version of the media asset.

In another example, MCP 7 may estimate the overall bandwidth utilization for the billing period based on historical data or some known event in the future. For example, MCP 7 may estimate that MCP 7 will receive more requests for media assets at the end of the month than at the beginning of the month. In this example, data transfer policy module 30 may store a data transfer policy that indicates there will be more requests for media assets at the end of the month that at the beginning of the month. The data transfer policy may also indicate that the $95^{th}$ percentile of the overall bandwidth utilization is going to be set when MCP 7 is predicted to receive the most requests for media assets. In this example, because data transfer policy indicates that the $95^{th}$ percentile of the overall bandwidth utilization is going to be set during the end of the month, VSM 28 may select versions of media assets that are encoded for a higher playback rate during the beginning part of the month, and select versions of media assets that are encoded for a lower playback rate during the ending part of the month. For example, the data transfer policy stored in data transfer policy module 30 may indicate that from day 1 to 20 the estimated overall bandwidth utilization is 100 mega-bits per second, and from day 21 to 30 the estimated overall bandwidth utilization is 200 mega-bits per second. VSM 28 may select versions of media assets 6 such that the overall bandwidth utilization is less than or equal to 200 mega-bits per second for day 1 to day 20 since MCP 7 will incur no additional cost by allowing bandwidth utilization at 200 mega-bits per second for day 1 to 20.

In another example, the data transfer policy sets the overall bandwidth utilization to the highest overall bandwidth utilization that defines the $5^{th}$ highest percentile of the overall bandwidth utilization that has already occurred during the billing period. In this example, the overall bandwidth utilization dynamically changes throughout the billing period. If MCP 7 transmits media assets for a long enough period of time, enough to define the $5^{th}$ percentile of the overall bandwidth utilization, the data transfer policy will indicate that MCP 7 should maintain at least that overall bandwidth utilization for the remainder of the billing period. Subsequently, if MCP 7 transmits data that results in higher bandwidth utilization then previously established for a long enough time to define the $5^{th}$ highest percentile, the data transfer policy will indicate that MCP 7 should maintain at least the higher bandwidth utilization for the remainder of the billing period.

In some embodiments, data transfer policy module 30 also stores an estimate of the number of clients that will download the media asset to aide in determining which version of media assets 6 should be transmitted. VSM 28 divides the desired overall bandwidth utilization stored in data transfer policy module 30 with the estimated number of clients that wish to download the media asset to determine the version of media asset that media server 5 needs to transmit. For example, for the very first client device 4 that transmits a request to download a media asset, VSM 28 may divide the desired overall bandwidth utilization with the estimated number of clients to calculate an estimation of how much bandwidth media server 5 should utilize to transmit the media asset to the very first client device 4 that requested the media asset. VSM 28 may then select the version of the media asset encoded for a certain playback rate such that when media server 5 transmits the selected version of the media asset, the bandwidth utilized by media server 5 is approximately equal to the estimated bandwidth that media server 5 should utilize.

MCP 7 may estimate the number of client devices that wish to download the media asset content and output that number to delivery information server 10. Delivery information server 10 may store that value within data transfer policy module 30. The estimate may be generated in a plurality of manners. For example, MCP 7 may base its estimation on the popularity of the media content. MCP 7 may estimate the number of client devices that wish to download the media asset using different techniques as well such as a historical number of client devices that previously downloaded media assets from media server 5.

In some embodiments, data transfer policy module 30 also stores characteristics of client devices to aid in determining which version of media assets 6 should be transmitted. Data transfer policy module 30 may store particular zip codes or network addresses for particular Internet service providers (ISPs). VSM 28 may determine which version of media assets 6 needs to be transmitted based on the zip code of the client devices 4 or the ISPs of the client devices 4. In some instances, it is desirable to transmit higher visual quality versions of media assets 6 to client devices that are located in a particular zip code, or are using a particular ISP. As described above, higher visual quality versions of media assets 6 may be encoded at a higher playback rate compared to lower visual quality versions of media assets 6. Data transfer module 30 may store characteristics other than just the zip code or ISP. VSM 28 may determine which version of media assets 6 needs to be transmitted based on characteristics other than the zip code or ISP.

Figure 4:
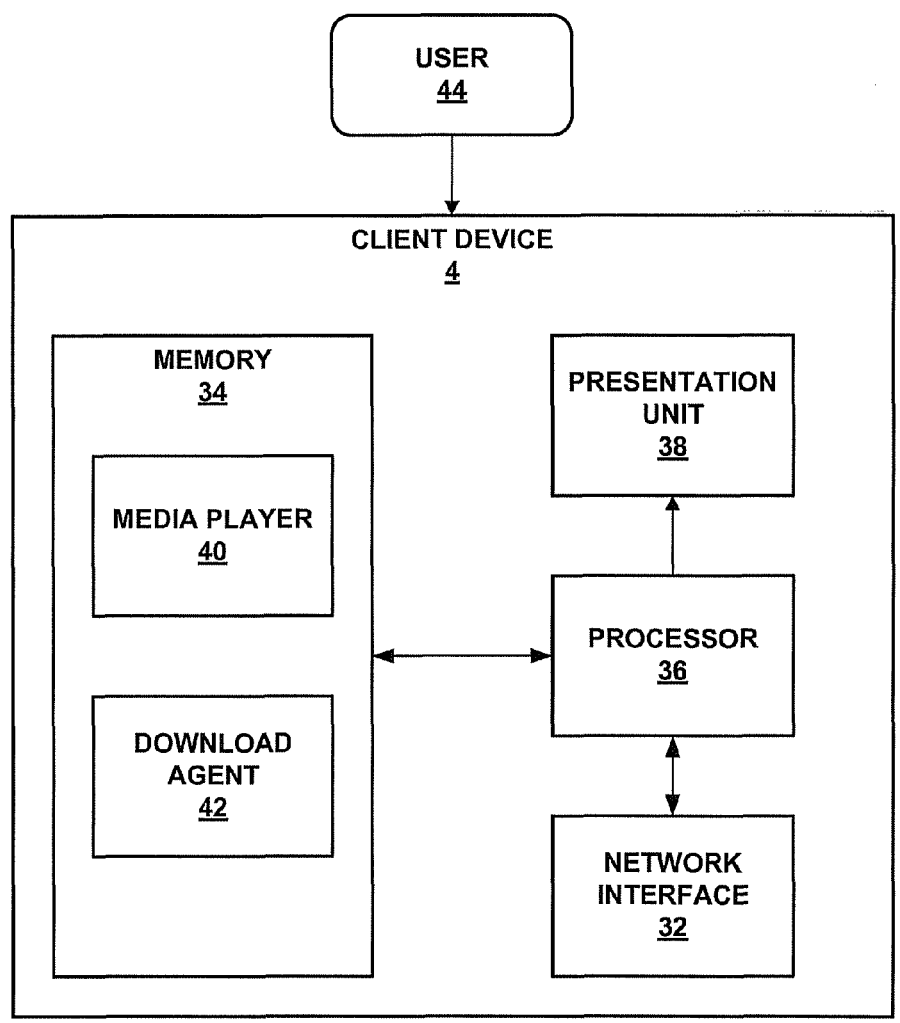
FIG. 4 is a block diagram illustrating various exemplary components of a client device.

FIG. 4 is a block diagram illustrating various exemplary components of each one of client devices 4. As noted above, each one of client devices 4 may be a wide variety of different types of devices. For example, client devices 4 may be a personal computer, a laptop computer, a mobile telephone, a personal media player, a device integrated into a vehicle, a network telephone, a network television, a television set-top box, a network appliance, or another type of network device.

In the example of FIG. 4, each one of client devices 4 includes a network interface 32, a memory 34, a processor 36, and a presentation unit 38. Network interface 32 facilitates communication between one of client devices 4 and network 8. Network interface 32 may be a variety of different types of network interface. For example, network interface 32 may be an Ethernet interface, a WiFi interface, a token ring interface, a fiber optic interface, a Bluetooth interface, a Wireless Broadband interface, a WiMax interface, or another type of network interface. Memory 34 may be a computer-readable medium such as a Random Access Memory unit, a disk drive, an optical disc, a floppy disk, a Flash memory unit, or another type of computer-readable medium. Processor 36 may be a microprocessor that includes one or more cores, an application-specific integrated circuit (ASIC), co-processor, or another type of integrated circuit. Processor 36 may execute instructions stored in memory 34. When processor 36 executes instructions stored in memory 34, the instructions may cause processor 36 to perform one or more actions. Presentation unit 38 may be a computer monitor, a television set, an integrated video screen, speakers, digital signage, a video projector, or another type of unit capable of presenting media.

In the example of FIG. 4, memory 34 includes a media player 40 and a download agent 42. Media player 40 and download agent 42 may be sets of instructions that, when executed cause processor 36 to perform various actions. For ease of explanation, when this disclosure states that media player 40 performs some action or states that download agent 42 performs some action, such phrases may be interpreted to mean that the instructions of media player 40 cause processor 36 to perform the action or to mean that the instructions of download agent 42 cause processor 36 to perform the action. However, it should be appreciated that in some implementations, media player 40 and/or download agent 42 may be implemented at least in part as hardware, in which case media player 40 and/or download agent 42 may perform some or all of the actions without any action by processor 36. Furthermore, it should be appreciated that in some implementations media player 40 and download agent 42 may be part of a common software package. In other words, the functionality of download agent 42 may be incorporated into media player 40.

A user 44 of client device 4 may interact with media player 40 when user 44 wants client device 4 to present a media asset. Example commercial media player applications include Windows Media Player™ and Silverlight™ from Microsoft Corporation of Redmond, Wash., Quicktime™ from Apple Computer of Cupertino, Calif., and Flash Video™ from Adobe Systems, Inc. of San Jose, Calif. User 44 may directly or indirectly instruct media player 40 to present a media asset. For example, user 44 may directly instruct media player 40 to present a media asset by inputting a Uniform Resource Locator associated with the media asset into a prompt presented by media player 40. In a second example, user 44 may indirectly instruct media player 40 to present a media asset by navigating a web browser application to a web page in which the media asset is embedded. In this second example, the web browser application may automatically instruct media player 40 to present the media asset.

When media player 40 is instructed to present a media asset, media player 40 may directly or indirectly instruct download agent 42 to retrieve the media asset. For example, media player 40 may use inter-process communication to directly instruct download agent 42 to retrieve the media asset. In another example, media player 40 may instruct an operating system of client device 4 to retrieve the media asset. In this example, the operating system may instruct download agent 42 to retrieve the media asset.

When download agent 42 is instructed to retrieve the media asset, download agent 42 may cause network interface 32 to output a playback rate request to a delivery information server 10 via network 8 (FIG. 1). The request may specify a resource identifier of the media asset. For example, download agent 42 may cause network interface 32 to output a Hypertext Transfer Protocol (HTTP) request that specifies a Uniform Resource Locator (URL) of the media asset.

Figures 5A, 5B:
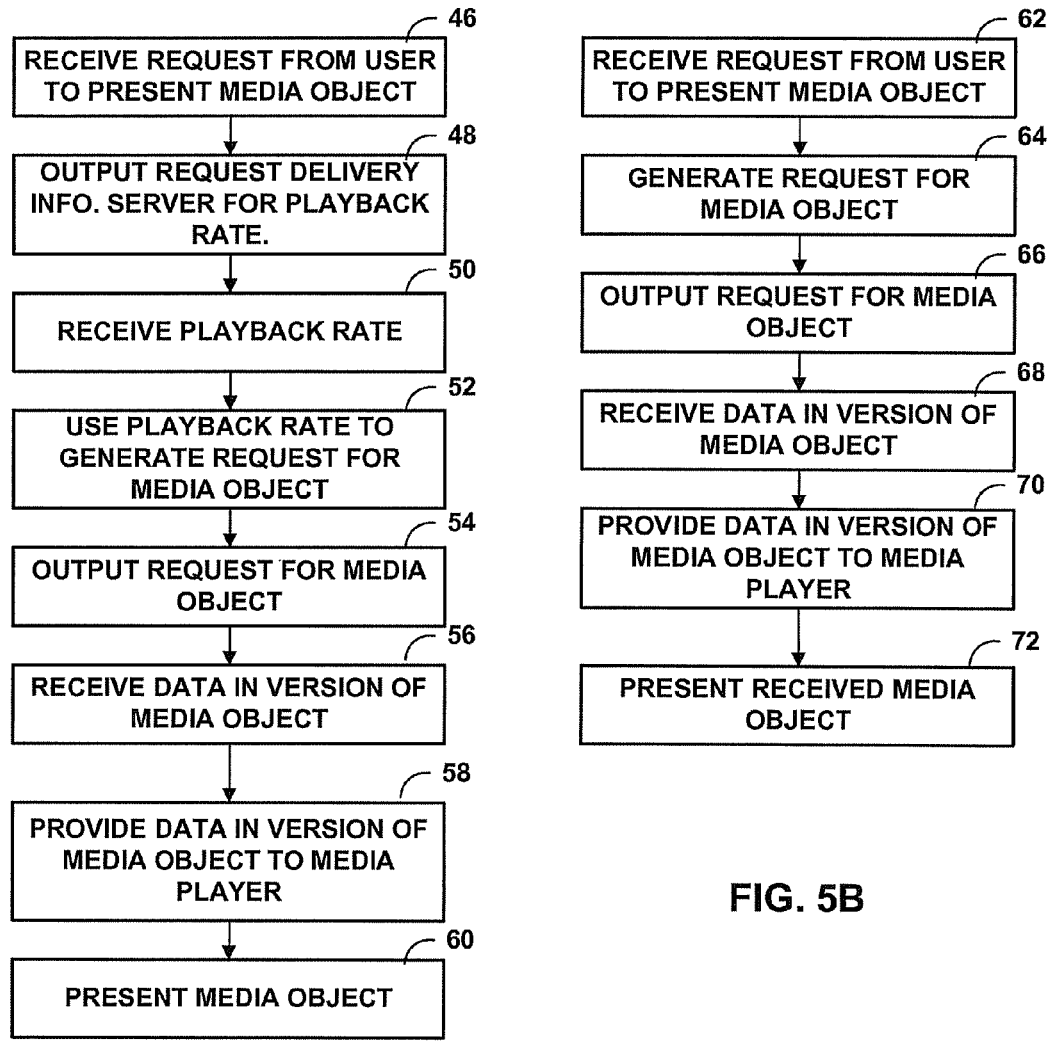
FIG. 5A is a flowchart illustrating a first example operation of a client device.
FIG. 5B is a flowchart illustrating a second example operation of a client device.

FIG. 5A is a flowchart illustrating a first example operation of one of client devices 4. Initially, media player 40 receives a request from user 44 to present a media asset (46). When media player 40 receives the request to present the media asset, download agent 42 may output a request to delivery information server 10 for a playback rate of the media asset (48). Subsequently, client device 4 may receive a message from delivery information server 10 that identifies the playback rate of the media asset (50). For example, download agent 42 may receive a message from delivery information server 10 that includes a URL of a version of the media asset that has a particular playback rate.

After download agent 42 receives the message that identifies the playback rate of the media asset, download agent 42 may use the playback rate to generate a request for the media asset that has the indicated playback rate (52). For example, if the message that indicates the playback rate includes a URL of a version of the media asset, download agent 42 may generate an HTTP request that specifies the URL. After download agent 42 generates the request for the version of the media asset that has the indicated playback rate, download agent 42 may output the request to media server 5 via network 8 (54).

Subsequently, network interface 32 may receive data in the version of the media asset that has the indicated playback rate via network 8 (56). As network interface 32 receives data in the version of the media asset, download agent 42 may provide the data in the version of the media asset to media player 40 (58). When media player 40 receives data in the version of the media asset, media player 40 may cause presentation unit 38 to present the version of the media asset (60).

FIG. 5B is a flowchart illustrating a second example operation of client device 4. Initially, media player 40 receives a request from user 44 to present a media asset (62). When media player 40 receives the request to present the media asset, download agent 42 may generate a request for the media asset (64). For example, download agent 42 may generate an HTTP request that specifies a URL of the media asset. The URL of the media asset may not be specific to any particular version of the media asset. After generating the request for the media asset, download agent 42 may output the request for the media asset to media server 5 (66).

Subsequently, network interface 32 may receive data in a version of the media asset from media server 5 (68). The playback rate of the version of the media asset may have been selected by media server 5 and delivery information server 10 without any additional acts by client device 4. As network interface 32 receives the data in the version of the media asset from media server 5, download agent 42 may provide the data in the version of the media asset to media player 40 (70). As media player 42 receives the data in the version of the media asset, media player 42 may cause presentation unit 38 to present the data in the media asset (72).

Figure 6A:
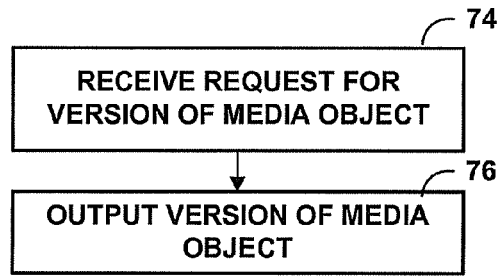
FIG. 6A is a flowchart illustrating a first exemplary operation of a media server.

FIG. 6A is a flowchart illustrating a first exemplary operation of media server 5. Media server 5 may perform the exemplary operation illustrated in FIG. 6A when client device 4 performs the exemplary operation illustrated in FIG. 4A.

In the exemplary operation illustrated in FIG. 5A, media server 5 may initially receive a request for a specific version of a media asset (74). For instance, media server 5 may receive an HTTP request that specifies a resource identifier of a version of the media asset that has a specific playback rate. After receiving the request, media server 5 may output data in the requested version of the media asset to client device 4 via network 8 (76).

Figure 6B:
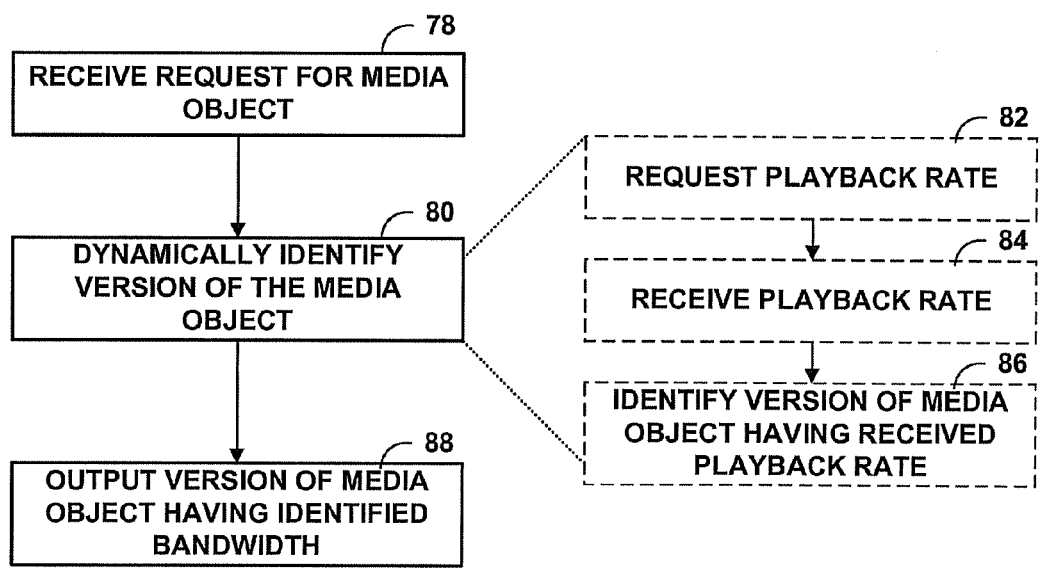
FIG. 6B is a flowchart illustrating a second exemplary operation of a media server.

FIG. 6B is a flowchart illustrating a second exemplary operation of media server 5. Media server 5 may perform the exemplary operation illustrated in FIG. 6B when client device 4 performs the exemplary operation illustrated in FIG. 5B.

Initially, media server 5 receives a request for a media asset (78). The request for the media asset may not be specific to any particular version of the media asset. When media server 5 receives this request for the media asset, media server 5 may dynamically identify a version of the media asset (80).

As illustrated in the example of FIG. 6B, media server 5 may, in one exemplary implementation, identify the version of the media asset based on the data transfer policy of MCP 7 by first requesting a playback rate from delivery information server 10 (82). Next, media server 5 may receive from delivery information server 10 a message that indicates the playback rate (84). Delivery information server 10 identifies the playback rate based on the data transfer policy of MCP 7. After media server 5 receives the playback rate from delivery information server 10, media server 5 may identify a version of the media asset that has the indicated playback rate (86). In this way, media server 5 identifies the version of the media asset. After media server 5 identifies the version of the media asset, media server 5 may output data of the identified version of the media asset to client device 4 via network 8 (88).

Figure 7:
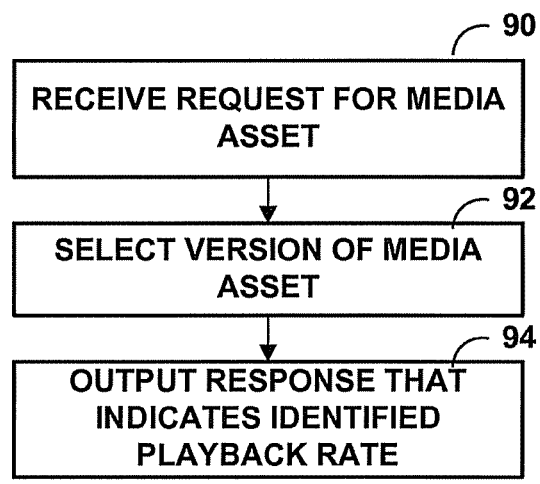
FIG. 7 is a flowchart illustrating an exemplary operation of a delivery information server.

FIG. 7 is a flowchart illustrating an exemplary operation of delivery information server 10. Initially, delivery information server 10 may receive a request from a plurality of client devices 4 that each indicate a media asset (90). In addition, the request may indicate a username of a user and other information.

After delivery information server 10 receives the request, delivery information server 10 may select a version of the media asset for each one the plurality of client devices (92). Delivery information server 10 may select the versions of the media assets such that when MCP 7 transmits the versions of the media assets, the overall bandwidth utilization of MCP 7 is substantially equal to a desired overall bandwidth utilization based on the data transfer policy. As discussed above, MCP 7 may have a wide variety of data transfer policies that indicate desired overall bandwidth utilization in order to serve a variety of different business purposes. For instance, a data transfer policy of MCP 7 may indicate a desired overall bandwidth utilization that is constant over the course of a billing period. In this instance, in order to ensure that the overall bandwidth utilization of MCP 7 is substantially equal to the desired overall bandwidth utilization, delivery information serer 10 may dynamically select versions of media assets encoded for lower playback rates during periods of high demand for data provided by MCP 7 and may dynamically select versions of media assets encoded for higher playback rates during period of low demand for data provided by MCP 7.

When delivery information server 10 selects a version of the media asset for each one of client devices 4, delivery information server 10 may output a response that explicitly or implicitly indicates the identified playback rate to each one of client devices 4 (94). In this way, delivery information server 10 may cause MCP 7 to transfer the selected versions of the media assets 6. For example, if the playback rate of the selected version of the media asset is 200 kilo-bits per second for client device 4A, delivery information server 10 may output a response to client device 4A that explicitly specifies the playback rate of 200 kilo-bits per second. In this example, client device 4A may then send a request to media server 5 for a version of the media asset having a playback rate of 200 kilo-bits per second. In another example, delivery information server 10 may output a response that specifies a URL of the selected version of the media asset, thereby implicitly indicating the identified playback rate.

Figure 8:
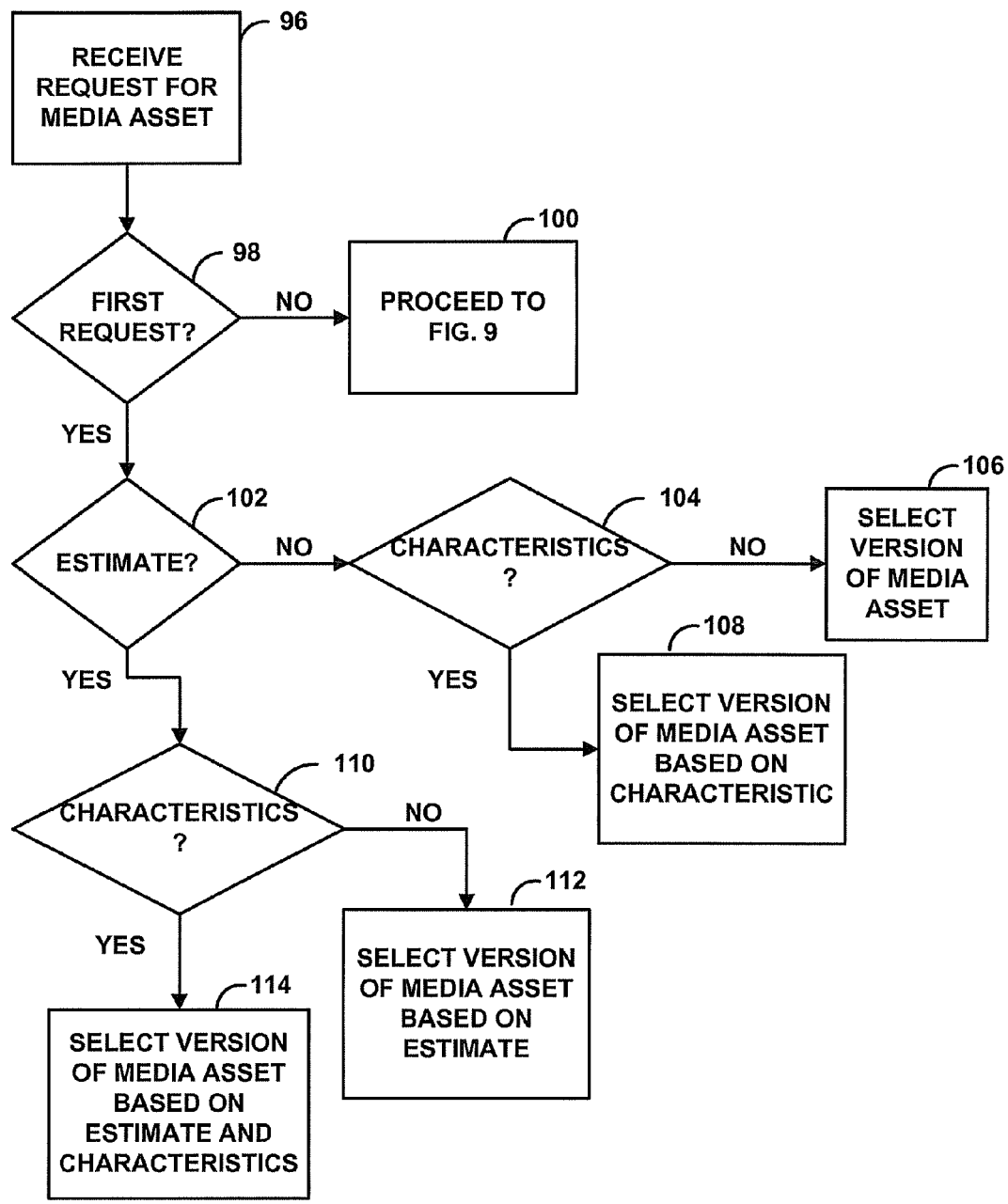
FIG. 8 is a flowchart illustrating an example operation of a version selection module (VSM) when a first one of the client devices requests to download a media asset.

FIG. 8 is a flowchart illustrating an example operation of VSM 28 when a first one of client devices 4 requests to download a media asset. Initially, VSM 28 may receive a request for a media asset that needs to be transmitted to one of client devices 4 (96). VSM 28 determines whether this is the first request for a media asset (98). If this is not the first request (NO of 98), i.e., there are other client devices 4 currently downloading from media server 5, VSM 28 proceeds to the steps shown in FIG. 9 (100). If this is the first request (YES of 98), VSM 28 queries data storage policy module 30 to determine whether there is an estimate of the number of clients that wish to download media assets 6 (102). If there is no estimate of the number of clients that wish to download media assets 6 (NO of 102), VSM 28 queries data storage policy module 30 to determine whether there are particular client characteristics that VSM 28 should take into account when deciding which one of media assets 6 needs to be transmitted (104). If there are no stored characteristics, VSM 28 arbitrarily selects one version of media assets 6 as the version that should be transmitted by media server 5 (106). In one embodiment, VSM 28 selects the version of media assets 6 that is encoded at a middle playback rate. For example, if there are three versions of media assets 6, a first media asset encoded for a playback rate of 10 mega-bits per second, a second media asset encoded for a playback rate 20 mega-bits per second, and a third media asset encoded for a playback rate 30 mega-bits per second, VSM 28 will select the media asset encoded for a 20 mega-bit per second playback rate.

If there is no estimate of the number of clients that will download versions of media assets 6, but there are client characteristics (YES of 104). VSM 28 determines which version of media assets 6 should be transmitted based on the client characteristics (108). For example, if the request came from a client device that is located at a zip code that data transfer policy module 30 indicates as an area where high quality media content should be transmitted, VSM 28 may select the version of media assets 6 that is encoded for the highest playback rate. Contrarily, if the request came from a client device that is located at a zip code that data transfer policy module indicates as an area where low quality media content should be transmitted, VSM 28 may select the version of media assets 6 that is encoded for the lowest playback rate. In some embodiments, data storage policy module 30 indicates which version of media assets 6 should be transmitted for a given client characteristic. In such embodiments, VSM 28 selects the version of media assets 6 that corresponds to the indicated version of media assets 6.

If there is an estimate of the number of clients that will download versions of media assets 6 (YES of 102), VSM 28 determines whether data transfer policy module 30 also includes client characteristic information (110). If client characteristics are available (YES of 110), VSM 28 determines which version of media assets 6 should be transmitted based on the estimate of the number of clients that will download the media asset and client characteristics (114). For example, VSM 28 may divide desired overall bandwidth utilization, stored in data transfer policy module 30, by the estimated number of clients that will download the media asset to generate an approximate bandwidth utilization value. VSM 28 may then determine which version of the media asset requires MCP 7 to utilize bandwidth that is equal to the approximate bandwidth utilization value. VSM 28 may then identify the playback rate of the determined version of the media asset. VSM 28 may then check the client characteristics. Based on the client characteristics, VSM 28 may select the version of media assets 6 that is encoded for a playback rate that is greater or less than the playback rate selected based on the division of the desired overall transfer rate and the estimated number of clients. For example, if there are five versions of media assets 6, the first one encoded for 1 mega-bit per second, the second one encoded for 2 mega-bits per second, the third one encoded for 3 mega-bits per second, the fourth one encoded for 4 mega-bits per second, and the fifth one encoded for 5 mega-bits per second. Assume that based on the estimated number of clients, VSM 28 determined that media server 5 should transmit the media asset encoded for a playback rate of 3 mega-bits per second. VSM 28 may select the 4 mega-bits per second version of media assets 6 for client devices whose characteristic indicate that they should receive higher visual quality versions of media content, and select the 2 mega-bits per second version of media assets 6 for client devices whose characteristics indicate that they should receive lower visual quality versions of media content. The previous example is just one possible technique that VSM 28 may utilize to determine which version of media assets 6 should be transmitted. There may be other possible techniques as well.

If there is an estimate of the number of clients that will download versions of media assets 6, but there are no client characteristics (NO of 110), VSM 28 determines which version of media assets 6 should be transmitted based only on the estimated number of clients (112). For example, VSM 28 may divide the desired overall bandwidth utilization by the estimated number of client that will download versions of the media asset to generate an approximate bandwidth utilization value. VSM 28 may then determine which version of the media assets requires MCP 7 to utilize bandwidth that is equal to the approximate bandwidth utilization value. VSM 28 may then identify the playback rate of the determined version of the media asset.

Figure 9:
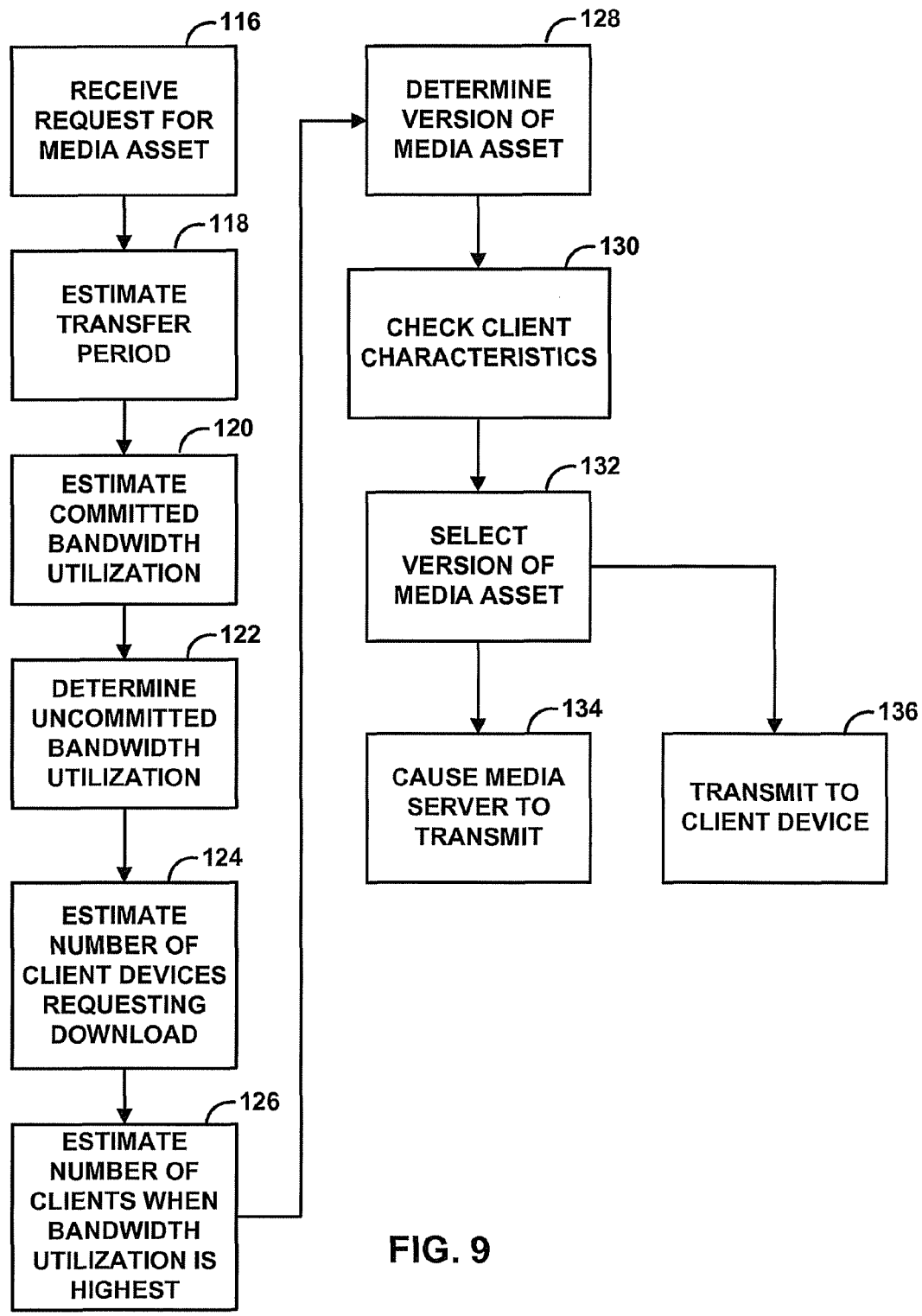
FIG. 9 is a flowchart illustrating an example operation of a VSM when the data transfer policy indicates a maximum desired overall bandwidth utilization.

FIG. 9 is a flowchart illustrating an example operation of VSM 28 when the desired overall bandwidth utilization indicates a maximum overall bandwidth utilization. As described above, the maximum overall bandwidth utilization may be set based on a charge that MCP 7 is willing to pay or may be based on an estimate of the overall bandwidth utilization during a billing period.

In the example operation shown in FIG. 9, one or more client devices 4 are currently downloading from media server 5. VSM 28 receives a request to download the media content of media assets 6 from one of client devices 4, such as client device 4A (116). VSM 28 then estimates a transfer period to transmit a version of media assets 6 (118). The transfer period is an estimate of the length of time it would take media server 5 to transmit one of media assets 6. It is important to note that the transfer time for a version of media assets 6 is not controlled by media server 5 or delivery information server 10. Media server 5 can only transmit media assets that are encoded for different playback rates. The time it takes for each one of client devices 4 to download the media asset, i.e. transfer period, is wholly controlled by the client devices and their respective ISPs. Therefore, VSM 28 can only estimate the transfer period for a media asset, and cannot determine with certainty what the transfer period will be.

VSM 28 may estimate the transfer period in various manners. For example, in one embodiment, VSM 28 is preprogrammed with some estimate for the transfer period for media assets 6. In another embodiment, VSM 28 estimates the transfer period based on historical client devices' download behavior. For example, VSM 28 gathers historical information regarding the length of time between when client devices requested to download a media asset and when the client devices terminated their download from media server 5. Some client devices 4 download the entire media asset and then terminate their connection. However, there may be some client devices 4 that terminate their connection before downloading the entire media asset. This may be because the media content is not entertaining or interesting. Also, as noted above each one of client devices 4 may take different amounts of time to download a media asset. VSM 28 may gather all this information and take an average to estimate the transfer period for media assets 6. VSM 28 may continually calculate and update an estimate of the transfer period based on the download behavior of client devices 4.

After estimating the transfer period, VSM 28 estimates the committed overall bandwidth utilization during the estimated transfer period (120). A committed overall bandwidth utilization for a transfer period is an overall bandwidth utilization at which media server 5 is committed to transferring previously requested media assets. The committed overall bandwidth utilization may be different at different times during the transfer period. For example, when client device 4A first transmitted a request to download a media asset, the committed overall bandwidth utilization may be 200 mega-bits per second. At a second time during the transfer of the media asset, media server 5 may have finished transmitting media assets to some of client devices 4, thereby reducing the committed overall bandwidth utilization during the transfer period. It is important to note that the committed overall bandwidth utilization does not take into account potential new client devices that will attempt to download media assets while media server 5 is transmitting a media asset to client device 4A. For example, during the estimated transfer period when media server 5 is transmitting a media asset to client device 4A, client device 4D, 4G, and 4X may transmit a request to download media assets 6. The committed overall bandwidth utilization does not take into account these possible new client devices 4 that will attempt to download media assets 6.

Next VSM 28 calculates the uncommitted overall bandwidth utilization (122). The uncommitted overall bandwidth utilization is an overall bandwidth utilization that is substantially equal to the difference between the desired overall bandwidth utilization and the committed overall bandwidth utilization during the transfer period.

Next VSM 28 estimates the number of client devices that will attempt to download media assets 6 from media server 5 during the transfer period (124). VSM 28 estimates the number of client devices that will attempt to download during the transfer period in various manners. In one embodiment, VSM 28 tracks the number of client devices 4 that have previously requested to download media assets within a given time interval. For example, VSM 28 may determine that in the previous 5 seconds 1000 client devices 4 requested to download media assets 6. Based on that value, VSM 28 may estimate that in the next 5 seconds it is more than likely that the trend will continue and another 1000 client devices 4 will request to download media assets 6. As another example, VSM 28 may determine that there is an overall trend for fewer and fewer client devices 4 requesting to download media assets 6, so VSM 28 may estimate the number of client devices 4 that will request to download media assets 6 during the transfer period based on this trend. Similarly, if the trend is that more and more client devices 4 are requesting to download media assets 6, VSM 28 may estimate based on this trend. VSM 28 may use any estimation technique to estimate the number of client devices 4 that will request to download media assets 6 during the transfer period.

Based on the estimation of the number of client devices 4 that will request to download media assets 6 during the transfer period and the committed overall bandwidth utilization, VSM 28 next estimates the maximum number of client devices 4 that will be downloading media assets during the transfer period (126). For example, when calculating the committed overall bandwidth utilization, VSM 28 may have determined that at a first time when client device 4A requested to download media assets 6, there were 1000 client devices 4 downloading media assets 6. At a second time, during the transfer period, VSM 28 may have estimated that 250 client devices 4 will terminate their connection with media server 5 because they downloaded the entire content, or because the media content was not interesting and they terminated their connection without completely downloading the media asset. VSM 28 may have also estimated that at the second time, 750 new client devices 4 will request to download the media assets. Therefore at the second time, there will be a total of 1500 client devices 4 (1000−250+750) that will be downloading media assets from media server 5. Similarly, VSM 28 may estimate that at a third time, there will be a total of 500 client devices 4 that will be downloading media assets, and at a fourth time, there will be a total of 2000 client devices 4 that will be downloading media assets.

VSM 28 may estimate the number of client devices 4 that will be downloading from media server 5 at various intervals within the estimated transfer period. Based on the various estimates at various time intervals within the transfer period, VSM 28 determines the maximum number of client devices 4 that will be downloading media assets from media server 5 during the transfer period. In the previous example, that would be at the fourth time interval when VSM 28 estimated that there will be 2000 client devices 4 downloading media assets.

VSM 28 then identifies a version of media assets 6 that should be transmitted to client device 4A (128). VSM 28 divides the uncommitted overall bandwidth utilization value, calculated at (122), with the maximum number of client devices 4 that will be downloading media assets from media server 5 during the transfer period to generate an approximate bandwidth utilization value. VSM 28 may then determine which version of the media assets requires MCP 7 to utilize bandwidth that is equal to the approximate bandwidth utilization value. VSM 28 may then identify the playback rate of the determined version of the media asset. In some embodiments, delivery information server 10 causes media server 5 to transmit the identified version of media assets 6 to client device 4A. Alternatively, delivery information serve 10 transmits the URL for the identified version of media assets 6 to client device 4A. Client device 4A then downloads the identified version of media assets 6 from media server 5.

In some embodiments, VSM 28 may perform an additional step of checking client characteristics to determine whether a different version of media assets 6 should be transmitted to client device 4A (130). For example, if client device 4A is located in a particular zip code or is using a particular ISP, VSM 28 may select a version of media assets 6 that is encoded at a slightly higher or lower playback rate than the identified version of media assets 6 (132).

After selecting the version of media assets 6, in one embodiment, delivery information sever 10 causes media server 5 to transmit the selected version of media assets 6 to client device 4A (134). In another embodiment, delivery information serve 10 transmits the URL for the selected version of media assets 6 to client device 4A. Client device 4A then downloads the selected version of media assets 6 from media server 5.

Figure 10:
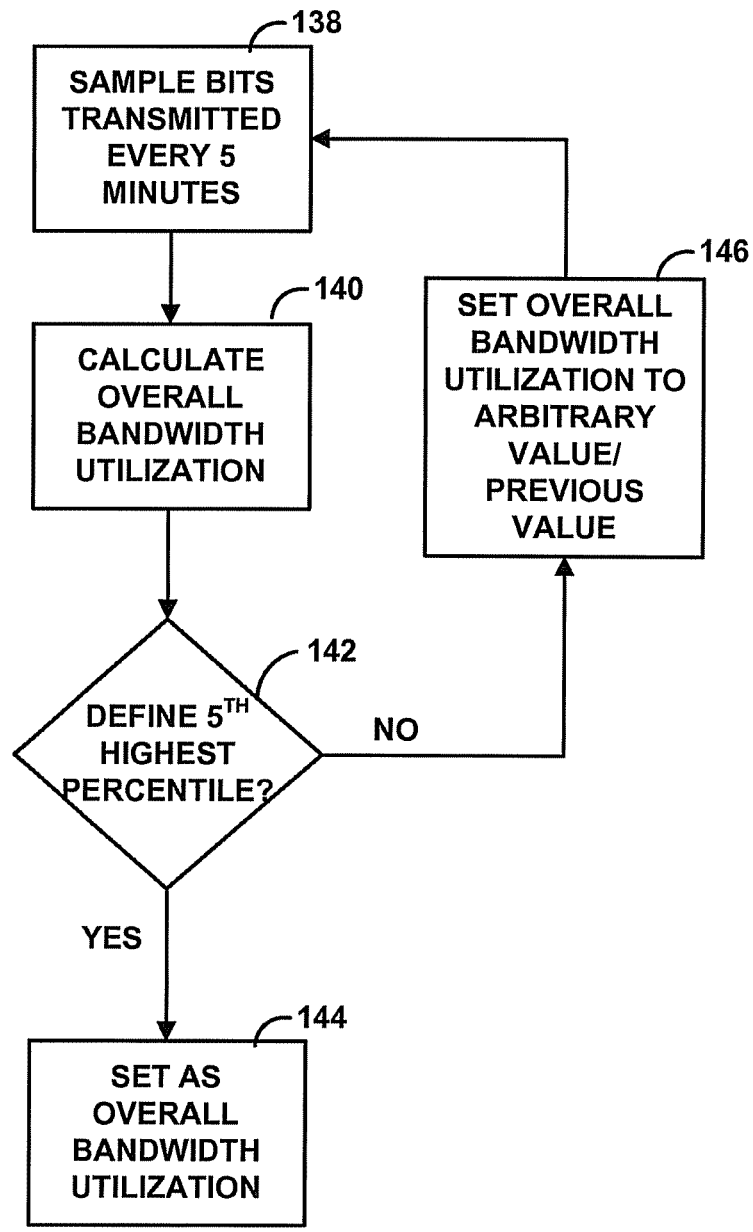
FIG. 10 is a flowchart illustrating the operation of a data transfer policy module when a desired overall bandwidth utilization changes over a billing period.

FIG. 10 is a flowchart illustrating the operation of data transfer policy module 30 in embodiments where the desired overall bandwidth utilization of MCP 7 changes over the billing period. As shown in FIG. 10, data transfer policy module 30 samples the number of bits transmitted by MCP 7 similar to the way service provider 3 samples the number of bits transmitted by MCP 7 as described above (138). Data transfer policy module 30 divides the number of bits transmitted by 5 minutes to generate an overall bandwidth utilization (140). Data transfer policy module 30 then determines whether there have been enough samples taken at the overall bandwidth utilization to define the $5^{th}$ highest percentile of bandwidth utilization over the billing period (142). For example, data transfer policy module 30 determines whether there are 432 samples at a current overall bandwidth utilization, where the current bandwidth utilization is greater than the previous overall bandwidth utilization. If there are not enough samples of the current overall bandwidth utilization to define the highest $5^{th}$ percentile (NO of 142), in one embodiment, if there is no set overall bandwidth utilization, data transfer policy module 30 sets the overall bandwidth utilization to some arbitrary bandwidth utilization value (146). In another embodiment, if there are not enough samples of the current overall bandwidth utilization to define the highest $5^{th}$ percentile (NO of 142), and there is a previously set overall bandwidth utilization, data transfer policy module 30 sets the overall bandwidth utilization to the previous overall bandwidth utilization (146). Data transfer policy module 30 then keeps sampling the overall bandwidth utilization. If there are enough samples of the current overall bandwidth utilization to define the highest $5^{th}$ percentile, data transfer policy module 30 sets the desired overall bandwidth utilization to the current overall bandwidth utilization.

Figure 11:
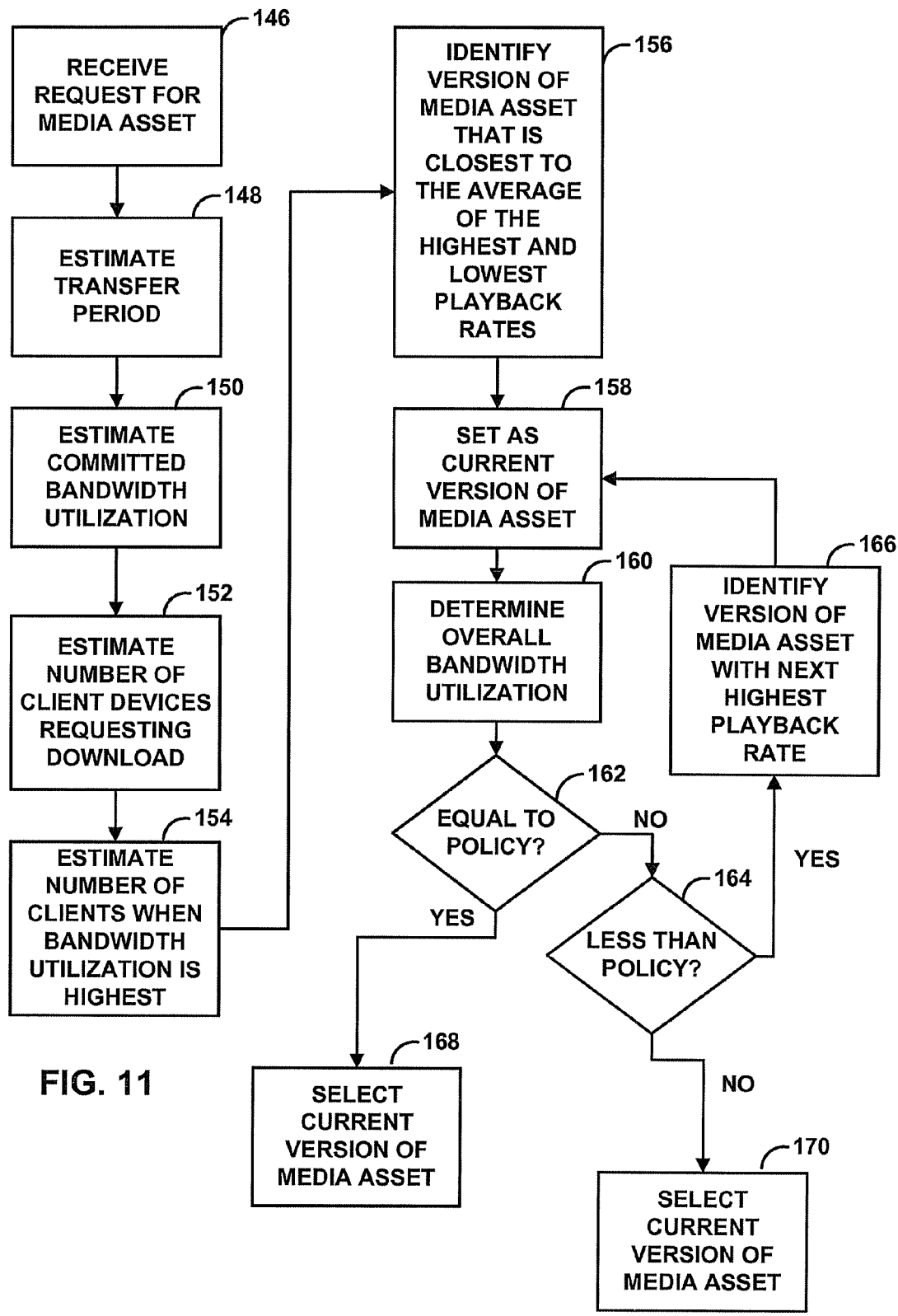
FIG. 11 is a flowchart illustrating another operation of VSM when a desired overall bandwidth utilization changes over a billing period.

FIG. 11 is a flowchart illustrating an example operation of VSM 28 when the desired overall bandwidth utilization changes during the billing period. VSM 28 may perform the exemplary operation illustrated in FIG. 11 when data transfer policy module 30 performs the exemplary operation illustrated in FIG. 10. In the example operation shown in FIG. 11, the desired overall bandwidth utilization is not some predetermined maximum overall bandwidth utilization. Instead, the desired bandwidth utilization changes during the billing period. In the example operation shown in FIG. 11, MCP 7 is not particularly concerned about the rate that service provider 3 will charge. MCP 7 is not willing to pay any charge and wants to keep the bandwidth utilization at a reasonable rate.

With respect to FIG. 11, steps 146-150 are the same as steps 116-120 (FIG. 9). Steps 152 and 154 are the same as steps 124 and 126 (FIG. 9). At step 156, VSM 28 identifies a version of media assets 6 that is encoded for a playback rate that is substantially equal to the average of the version of media assets 6 that is encoded for the highest and lowest playback rate. VSM 28 then sets the identified version of media assets 6 as a current media asset (158). VSM 28 then determines the overall bandwidth utilization if media server 5 were to transmit the current media asset to client device 4A (160). VSM 28 determines the overall bandwidth utilization based on the committed overall bandwidth utilization and the estimated number of clients that will request to download versions of media assets 6 during the transfer period.

VSM 28 then calculates whether the determined overall bandwidth utilization is equal to the data transfer policy stored in data transfer policy module 30 (162). If the determined overall bandwidth utilization is equal to the data transfer policy (YES of 162), VSM 28 selects the current version of media assets 6 as the media asset that media server 5 needs to transmit.

If the overall bandwidth utilization is not equal to the data transfer policy (NO of 162), VSM 28 calculates whether the determined overall bandwidth utilization is less than the data transfer policy (164). If the determined overall bandwidth utilization is greater than the data transfer policy (NO of 164), VSM 28 selects the current version of media assets 6 as the version that media server 5 needs to transmit to client device 4A.

If the determined overall bandwidth utilization is less than the data transfer policy (YES of 164), VSM 28 identifies a version of media assets 6 that is encoded for the next highest playback rate compared to the current version of media assets 6 (166). VSM 28 then sets the identified version of media assets 6 as the current version of media assets 6 and determines the bandwidth required to transmit the current version of media assets 6 (158). VSM 28 keeps selecting versions of media assets 6 that are encoded for a higher playback rate than the current media asset until the determined overall bandwidth utilization is greater than or equal to the data transfer policy.

As described so far, in some embodiments, delivery information server 10 selects a version of media assets 6 such that the overall bandwidth utilization is less than or equal to a desired overall bandwidth utilization. For example, in embodiments where MCP 7 sets a maximum overall bandwidth utilization, delivery information server 10 selects a version of media assets 6 such that the overall bandwidth utilization does not exceed the maximum overall bandwidth utilization. Client devices 4 then start to download the selected versions of media assets 6.

However, in some embodiments it may be advantageous to require client devices 4 to dynamically switch from downloading the selected version of media assets 6 and download from a new version of media assets 6 that is encoded for a higher or lower playback rate. For example, in some instances, it may be possible that the overall bandwidth utilization approaches the maximum desired overall bandwidth utilization. In such instances, it may be beneficial to require each one of client devices 4 to dynamically switch to a version of media assets 6 that is encoded for a lower playback rate. The disclosure below describes embodiments that allow a client device to dynamically switch between different versions of media assets 6.

To force client devices 4 to dynamically switch to a new version of media assets 6, delivery information server 10 transmits a command to each one of client devices 4 indicating that they need to dynamically switch to a different version of media assets 6. Alternately, delivery information server 10 makes available in a location accessible to and periodically checked by client devices 4, that each of client devices 4 should switch to a different version of media asset 6 as possible. In response, as explained in more detail below, each one of client devices 4 dynamically switches from the current version of the media asset to the new version of the media asset.

Figure 12:
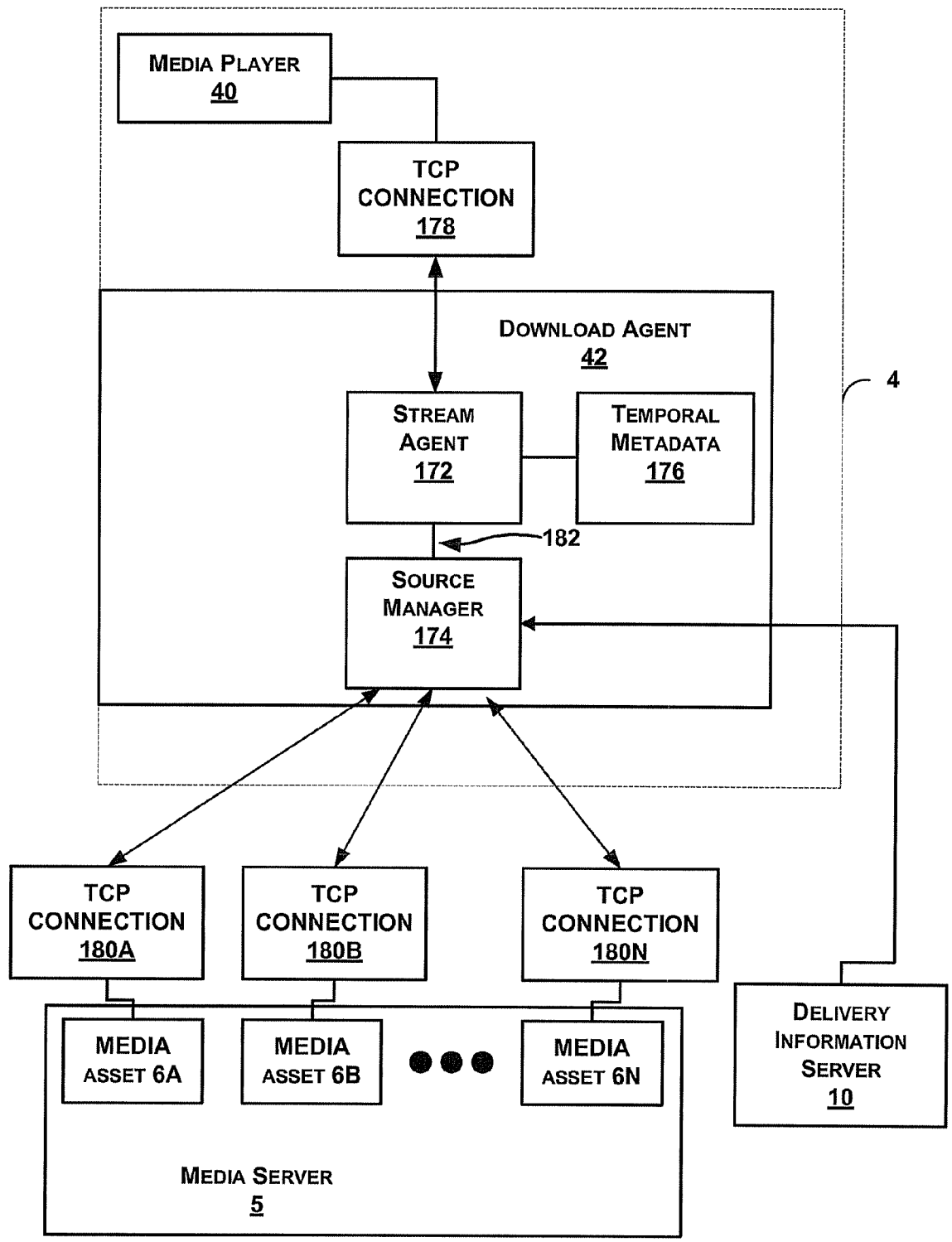
FIG. 12 is a block diagram illustrating an exemplary download agent connected to the media server.

FIG. 12 is a block diagram illustrating an exemplary download agent 42 connected to a media server 5. For clarity, the other components on client device 4 have been omitted to show the relationship between download agent 42 and media server 5. In the example embodiment, download agent 42 includes playback controller 22, stream agent 172, source manager 174, and temporal metadata 176. For purpose of example, media player 40 is shown as external to download agent 42, however, as described above, download agent 42 may encapsulate media player 40.

As shown in FIG. 12, download agent 42 provides content to media player 40 via a single TCP connection 178 internal to client device 4. Download agent 42 may, for example, open and maintain a single socket connection for communication of downloaded media content to media player via TCP connection 178. In this example, TCP connection 178 may be a standard transmission control protocol (TCP) connection used in Open Systems Interconnection Basic Reference Model (OSI). TCP connection 178 remains constant between media player 40 and download agent 42 regardless of the playback rate of a particular media asset that are being downloaded by download agent 42; download agent seamlessly splices the different media assets onto TCP connection 178 so that media player 40 is unaware of any dynamic playback rate switches selected by download agent 42.

As described above, media server 5 may include a plurality of media files 6A-6N that generally represent exemplary media assets. Media files 6 may each contain similar content (e.g., the same movie), but at different encoding quality. As shown in FIG. 12, download agent 42 may initiate and establish a plurality of different TCP connections 180A-180N (herein referred to as "TCP connections 180") through network 8 for downloading one or more of media assets 6 from media server 5.

In general, source manager 174 handles connection management for access and retrieval of data from media assets 6 within media server 5. Source manager 174 handles all specific implementation details necessary for acquiring the media content and providing the data to stream agent 172. In this example, source manager implements a plurality of TCP network stacks and may concurrently handle multiple TCP connections 178 to media server 5. Source manager 174 de-multiplex the input data streams from media assets 6 as directed by stream agent 172.

As described above, in the context of video, each of media assets 6 typically contains a plurality of video frames encoded in accordance with a video compression scheme. One type of frame is referred to as a key frame or intra picture that can be decoded without reference to other frames and may, for example, provide an entire encoded picture. The term "key frame" is used herein to generally refer to this type of frame within an encoded media stream. In the context of H.264 coding, key frames are referred to as "i-frames." Between each key frame are predicted pictures or bi-predicted pictures that generally contain image data and motion vector displacements that are relative to the previous key frame in the media file. Download agent 42 coordinates and initiates dynamic transition such that the cut-over between playback rates from one of media files 6 to another occurs at a video frame that is not dependent on other video frames within the stream, i.e., a key frame.

In general, stream agent 172 is responsible for serializing disparate streams of media assets 6 into a valid output stream for delivery to media player 40 via TCP connection 178 while additionally performing any required transformations to the stream data in the form of dynamic playback rate transitions. Upon a request by delivery information server 10 to source manager 174 to switch to a new version of media assets 6, stream agent downloads metadata contained within a first segment of the version of media assets 6 selected by delivery information server 10. For example, the metadata within each of media assets 6 may indicate that video frames in the media object are encoded in accordance with the H.264 format and are to be presented at a rate of 35 frames per second. In addition, the metadata may indicate other data such as copyright information, whether the media is to be presented in black and white, information that identifies an artist associated with the media object, and other information. In addition, the metadata contained within each of media assets 6 includes a key frame list that indicates byte indexes associated with key frames for the respective media file.

Based on the downloaded metadata, generates temporal metadata 176 that correlates the time stamps for key frames for the different version of media assets 6 selected by delivery information server, to byte offsets in the various media file formats. For example, temporal metadata 176 may be arranged as an array or other data structure that identifies sets of key frames having substantially similar time offsets within the media to be presented (e.g., a first set of key frames having a key frame selected from each of the media files at approximately 3 seconds of playback, a second set of key frames associated with approximately 7 seconds of playback, and the like). Temporal metadata 176 then correlates the key frames of the version of media assets to appropriate byte offsets within media assets 6. In this way, the byte offsets within media assets for temporally proximate key frames are correlated and stored within temporal metadata 176.

In some embodiments, temporal metadata 176 may not be part of download agent 42. Instead temporal metadata 176 may reside on either media server 5 or delivery information server 10. In these embodiments, download agent 42 may receive a list of key frames for new version of media assets 6 from media server 5 or delivery information server 10. The key frame for each one of media assets may already by temporally proximate to one another. Additionally, media server 5 or delivery information server 10 may correlate the byte offsets within media assets 6 for temporally proximate key frames.

Stream agent 172 interacts with source manager 174 to request data from specific portions of media assets 6 and blends data from the disparate streams of media assets 6 into a valid output stream 182 while performing any required transformations to the stream data. For example, source manager 174 may request particular segments of the new version of media assets 6 and extract the application-layer media data from the new version of media assets 6 for placement into a respective "container." Stream agent 172 may then interact with the appropriate software container of source manager 174 to retrieve the appropriate media data. Stream agent 172 may be preprogrammed to perform actions on specific media file formats such as Flash Format (FLU) used by Adobe Flash Player, provided by Adobe Systems, Inc., Advanced System Format (ASF) used by Windows Media Player, provided by Microsoft Inc., or other media file formats. Stream agent 172 may also ensure that download from the new version of media assets 6 is forecasted based on conditions and that the resultant data stream are stitched together at temporally correlated key frames. In this manner, user 44 viewing media player 40 may be oblivious to the automated functions of download agent 42.

As described herein, MCP 7 selects versions of media assets stored on media server 5 such that when media server 5 transmits the selected versions an overall bandwidth utilization is less than or equal to a desired overall bandwidth utilization. The different versions of media assets are encoded for playback rates. MCP 7 may utilize different amounts of bandwidth to transmit the media assets that are encoded for different playback rates. Accordingly, MCP 7 can control its bandwidth utilization by selecting different versions of the media assets. The bandwidth required to transmit a media asset may be based on the compression of the media asset.

As described above, one technique for calculating the bandwidth required to transmit the media asset is to divide the total number of bits of the compressed media asset by the playback duration of the media asset. This technique provides an average overall bandwidth requirement, i.e., an average of the bandwidth required to transmit the entire media asset. However, there may be portions within the media asset that require more or less bandwidth for transmission. For example, assume an uncompressed media asset comprises a total 10 mega-bits and the duration is 10 seconds. A first portion, e.g., the first 5 seconds of the media asset, may represent rapid visual changes and a second portion, e.g., the last 5 seconds of the media asset, may represent minimal visual changes. After encoding, the first portion may compress to 4 mega-bits and the second portion may compress to 1 mega-bit. Therefore the total size of the compressed media asset is 5 mega-bits that need to be displayed in 10 seconds. According to the first technique to calculate the bandwidth required to transmit the media asset to achieve uninterrupted playback, the required bandwidth is 500 Kbps (5 mega-bits divided by 10 seconds). This required bandwidth may be referred as the average overall bandwidth requirement.

However, in this example, 4 mega-bits that comprise the first portion of the media asset need to be transmitted in 5 seconds. Therefore the bandwidth required to transmit the first portion is 800 Kbps (4 mega-bits divided by 5 seconds). In this example, 1 mega-bits that comprise the second portion need to be transmitted in 5 seconds. Therefore the bandwidth required to transmit the second portion is 200 Kbps (1 megabit divided by 5 seconds. The requirement to transmit each portion of the media asset may be referred to as the average portion bandwidth requirement.

The average overall bandwidth requirement fails to account for portions within the media asset with rapid visual changes or minimal visual changes. As illustrated in the example above, based on the actual content of the media asset, different portions within the media asset may require more or less bandwidth for transmission compared to bandwidth requirement provided by the average overall bandwidth requirement. The average portion bandwidth requirement may be a better indication of the bandwidth required to transmit a media asset.

In some examples, media server 5 and/or data storage module 30 may store a list of key frames and corresponding timestamps for each version of the media assets. Based on the key frames and timestamps, media server 5 and/or data storage module 30 calculate the bandwidth required to transmit various portions of the media assets. For example, a portion may be defined as 100 frames. For each version of the media assets, media server 5 and/or data storage module 30 may determine the total number of bits between the first 100 frames and the duration of the first 100 frames. Media server 5 and/or data storage module 30 may determine the bandwidth required to transmit the first 100 frames by dividing the number of bits between the first 100 frames by the duration of the first 100 frames. Media sever 5 and/or data storage module 30 may repeat this calculation for all the frames in 100 frame increments. A portion of 100 frames is provided only for illustration purposes.

In some examples of this disclosure, VSM 28 (FIG. 3) may account for the fact that MCP 7 utilizes different amount of bandwidths for different portions within a media asset. As described in step 120 of FIG. 9 and step 150 of FIG. 11, VSM 28 estimates the committed overall bandwidth utilization during the estimated transfer period. As described above, the committed overall bandwidth utilization for a transfer period is an overall bandwidth utilization at which media server 5 is committed to transferring previously requested media assets. In some examples, to calculate the committed overall bandwidth utilization, VSM 28 only considers the overall average bandwidth required to transmit the media assets which media server 5 is committed to transfer, as described above with respect to FIG. 9.

In an alternative example, VSM 28 considers the portion average bandwidth of the media assets during the estimated transfer period. By considering the portion average bandwidth, VSM 28 may produce a better calculation for the committed overall bandwidth utilization. For example, assume client device 4A, 4B, and 4C requested media assets 6A, 6B, and 6C, respectively. VSM 28 estimated the transfer period to be 30 minutes. Assume that the average bandwidths required to transmit media assets 6A, 6B, and 6C are 1 Mbps, 2 Mbps, and 3 Mbps, respectively. Assume that the portion average bandwidth for the first 15 minutes of media assets 6A, 6B, and 6C is 0.5 Mbps, 1 Mbps, and 2 Mbps, respectively. Assume the portion average bandwidth for the last 15 minutes of media assets 6A, 6B, and 6C is 1.5 Mbps, 3 Mbps, and 4 Mbps, respectively. In this example, the portion is defined as 15 minutes. Note that the average of the bandwidth of the first 15 minutes and last 15 minutes of media assets 6A, 6B, and 6C is the same as the overall average bandwidth of media assets 6A, 6B, and 6C. For example, the average of 0.5 Mbps and 1.5 Mbps is 1 Mbps, i.e., the overall average bandwidth of media asset 6A.

If VSM 28 only used the overall average bandwidth to estimate the committed overall bandwidth utilization, then VSM 28 will determine that the committed overall bandwidth utilization for the 30 minute transfer period is 6 Mbps (1 Mbps+2 Mbps+3 Mbps). However, if VSM 28 used the portion average bandwidth to estimate the committed overall bandwidth utilization, then VSM 28 will determine that the committed overall bandwidth utilization for the first 15 minutes of the 30 minute transfer period is 3.5 Mbps (0.5 Mbps+1 Mbps+2 Mbps). VSM 28 will also determine that the committed overall bandwidth utilization for the last 15 minutes of the 30 minute transfer period is 8.5 Mbps (1.5 Mbps+3 Mbps+4 Mbps). In this manner VSM 28 has a more accurate estimate of the overall bandwidth utilization as compared to when VSM 28 only relies on the overall average bandwidth.

As described above, based on the committed overall bandwidth, VSM 28 calculates the uncommitted bandwidth utilization in step 122 of FIG. 9. By using the portion average bandwidth, VSM 28 may be capable of determining a better estimate of the uncommitted bandwidth utilization.

As described above, VSM 28 identifies a version of media assets 6 that should be transmitted by dividing the uncommitted overall bandwidth utilization with the maximum number of client devices 4 that will be downloading media assets from media server 5 during the transfer period as described with respect to step 128 in FIG. 7. By using the portion average bandwidth, VSM 28 may select a better version of media assets 6 compared to only using the overall average bandwidth. For example, assume as described above, that the committed overall bandwidth utilization for the first 15 minutes of a 30 minute interval is 3.5 Mbps and the committed overall bandwidth utilization for the last 15 minutes of the 30 minute interval is 8.5 Mbps as determined based on the portion average bandwidth of media assets 6A, 6B, and 6C. Assume that the desired overall bandwidth utilization is 20 Mbps. Accordingly, the uncommitted bandwidth utilization will be 16.5 Mbps for the first 15 minutes and 11.5 Mbps for the last 15 minutes.

Assume that VSM 28 estimated that there will be 10 clients trying to download media assets 6 as described with respect to step 126 of FIG. 9. For those 10 clients, VSM 28 may select a version of media assets 6 that require a bandwidth of 1.65 Mbps (16.5 Mbps divided by 10) for transmission for the first 15 minutes in the time interval of the video content, and select a version of media assets 6 that require a bandwidth of 1.15 Mbps (11.5 divided by 10) for transmission for the last 15 minutes in the time interval of the video content. Client devices 4 may splice together the content from the different versions of media assets 6 as described above with respect to FIG. 12.

Keeping with this example numbers, if VSM 28 only used overall average bandwidth, then VSM 28 will decide that the committed bandwidth utilization is 6 Mbps. The uncommitted bandwidth utilization will be 14 Mbps and the identified version of the media asset will be the media asset that requires a bandwidth of 1.4 Mbps (14 Mbps divided by 10 clients) for transmission. Accordingly, if VSM 28 only used overall average bandwidth than for the first 15 minutes of the time interval, VSM 28 selected a lower quality version of media asset 6 as compared to if VSM 28 used portion average bandwidth, e.g., media asset encoded for 1.4 Mbps provides lower quality media content compared to a media asset encoded for 1.65 Mbps.

Accordingly, in some examples, VSM 28 may use only the overall average bandwidth to select versions of media assets 6 that media server 5 should transmit. In some alternate examples, VSM 28 may use the portion average bandwidth to select version of media assets 6 that media server 5 should transmit.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory ("RAM") such as synchronous dynamic random access memory ("SDRAM"), read-only memory ("ROM"), non-volatile random access memory ("NVRAM"), electrically erasable programmable read-only memory ("EEPROM"), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors ("DSPs"), general purpose microprocessors, application-specific integrated circuits ("ASICs"), field programmable logic arrays ("FPGAs"), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder ("CODEC").

Various embodiments of the invention have been described. These and other embodiments are within the scope of the following claims.

The invention claimed is:

1. A method comprising:
   determining, by a device including a processor, a desired overall bandwidth utilization for at least one network resource during a billing period; and
   selecting, by the device, one of a plurality of versions of a media asset to respond to a request for the media asset based upon the desired overall bandwidth utilization, wherein respective versions of the media asset have respective differing bandwidth utilizations of the at least one network resource.

2. The method of claim 1, wherein the desired overall bandwidth utilization is a maximum overall bandwidth utilization for the billing period.

3. The method of claim 1, wherein the desired overall bandwidth utilization is an estimated overall bandwidth utilization for the billing period.

4. The method of claim 3, further comprising determining, by the device, the estimated overall bandwidth utilization based upon at least one of historical overall bandwidth utilization or a known future event that will impact overall bandwidth utilization.

5. The method of claim 1, further comprising dynamically adjusting, by the device, the desired overall bandwidth utilization to a current highest overall bandwidth utilization for the billing period.

6. A system, comprising:
   at least one processor;
   at least one non-transitory computer readable medium communicatively coupled to the at least one processor, the at least one non-transitory computer readable medium having stored therein computer-executable instructions, comprising:
   a data transfer policy module that determines a desired overall bandwidth utilization for at least one network resource during a billing period; and
   a version selection module that selects one of a plurality of versions of a media asset to respond to a request for the media asset based upon the desired overall bandwidth utilization, wherein respective versions of the media asset have respective differing bandwidth utilizations of the at least one network resource.

7. The system of claim 6, wherein the desired overall bandwidth utilization is a maximum overall bandwidth utilization for the billing period.

8. The system of claim 6, wherein the desired overall bandwidth utilization is an estimated overall bandwidth utilization for the billing period.

9. The system of claim 8, wherein the data transfer policy module determines the estimated overall bandwidth utilization based upon at least one of historical overall bandwidth utilization or a known future event that will impact overall bandwidth utilization.

10. The system of claim 6, wherein the data transfer policy module dynamically adjusts the desired overall bandwidth utilization to a current highest overall bandwidth utilization for the billing period.

11. A non-transitory computer-readable medium having instructions stored thereon that, in response to execution, cause at least one device to perform operations comprising:
    determining a desired overall bandwidth utilization for at least one network resource during a billing period; and
    selecting one of a plurality of versions of a media asset to respond to a request for the media asset based upon the desired overall bandwidth utilization, wherein respective versions of the media asset have respective differing bandwidth utilizations of the at least one network resource.

12. The non-transitory computer-readable medium of claim 11, wherein the desired overall bandwidth utilization is a maximum overall bandwidth utilization for the billing period.

13. The non-transitory computer-readable medium of claim 11, wherein the desired overall bandwidth utilization is an estimated overall bandwidth utilization for the billing period.

14. The non-transitory computer-readable medium of claim 13, wherein the operations further comprise determining the estimated overall bandwidth utilization based upon at least one of historical overall bandwidth utilization or a known future event that will impact overall bandwidth utilization.

15. The non-transitory computer-readable medium of claim 11, wherein the operations further comprise dynamically adjusting the desired overall bandwidth utilization to a current highest overall bandwidth utilization for the billing period.

16. A system, comprising:
- means for determining a desired overall bandwidth utilization for at least one network resource during a billing period; and
- means for selecting one of a plurality of versions of a media asset to respond to a request for the media asset based upon the desired overall bandwidth utilization, wherein respective versions of the media asset have respective differing bandwidth utilizations of the at least one network resource.

17. The system of claim 16, wherein the desired overall bandwidth utilization is a maximum overall bandwidth utilization for the billing period.

18. The system of claim 16, wherein the desired overall bandwidth utilization is an estimated overall bandwidth utilization for the billing period.

19. The system of claim 18, further comprising means for determining the estimated overall bandwidth utilization based upon at least one of historical overall bandwidth utilization or a known future event that will impact overall bandwidth utilization.

20. The system of claim 16, further comprising means for dynamically adjusting the desired overall bandwidth utilization to a current highest overall bandwidth utilization for the billing period.

* * * * *